United States Patent
Fujii et al.

(10) Patent No.: US 8,181,263 B2
(45) Date of Patent: May 15, 2012

(54) DATA COMMUNICATION SYSTEM CONTROLLING AVAILABLE ADDRESSEES FOR DATA BASED ON PRESELECTED SECURITY LEVEL OF USER AND ADDRESSEE LOCATION

(75) Inventors: Shuhji Fujii, Kizugawa (JP); Yuji Okamoto, Souraku-gun (JP)

(73) Assignee: Sharp Kabushiki Kaisha, Osaka (JE)

( * ) Notice: Subject to any disclaimer, the term of this patent is extended or adjusted under 35 U.S.C. 154(b) by 732 days.

(21) Appl. No.: 12/321,053

(22) Filed: Jan. 15, 2009

(65) Prior Publication Data
US 2009/0187758 A1    Jul. 23, 2009

(30) Foreign Application Priority Data

Jan. 18, 2008   (JP) ................................. 2008-009660

(51) Int. Cl.
*G06F 7/04* (2006.01)
*G06F 17/30* (2006.01)
*H04N 7/16* (2006.01)
*G06F 15/16* (2006.01)
*G06F 3/12* (2006.01)

(52) U.S. Cl. ............ 726/28; 726/29; 358/1.15; 709/217
(58) Field of Classification Search .................... 726/28, 726/29; 358/1.15
See application file for complete search history.

(56) References Cited

U.S. PATENT DOCUMENTS

| 7,756,937 | B2 * | 7/2010 | Yanagi et al. | 709/206 |
|---|---|---|---|---|
| 7,831,665 | B2 * | 11/2010 | Litwiller et al. | 709/205 |
| 2003/0084050 | A1 * | 5/2003 | Hall et al. | 707/10 |
| 2003/0164989 | A1 * | 9/2003 | Yajima | 358/402 |
| 2005/0108530 | A1 * | 5/2005 | Tonegawa | 713/170 |
| 2006/0095433 | A1 * | 5/2006 | Kano | 707/10 |
| 2006/0126100 | A1 * | 6/2006 | Jung | 358/1.14 |
| 2007/0050518 | A1 | 3/2007 | Yamade | |
| 2007/0130135 | A1 * | 6/2007 | Hagiuda | 707/4 |
| 2008/0046523 | A1 * | 2/2008 | Yanagi et al. | 709/206 |

FOREIGN PATENT DOCUMENTS

| JP | 2002-354162 | 12/2002 |
|---|---|---|
| JP | 2004-104180 | 4/2004 |
| JP | 2005-026876 A | 1/2005 |
| JP | 2006-222636 A | 8/2006 |
| JP | 2007-049327 | 2/2007 |

* cited by examiner

*Primary Examiner* — Christian LaForgia
(74) *Attorney, Agent, or Firm* — Edwards Wildman Palmer LLP; David G. Conlin; David A. Tucker

(57) ABSTRACT

An LDAP server stores security levels individually assigned to a plurality of destinations and a plurality of users in advance. When a user is authenticated successfully by the LDAP server, a control section of a multi-functional machine obtains the security level of the authenticated user from the LDAP server via a communication section, and then restricts/relaxes display contents necessary in transmission processing, in accordance with the high/low of the security level. Further, when the security level is not lower than a predetermined threshold value, the control section obtains from the LDAP server a destination in which the user is adopted as the addressee.

12 Claims, 18 Drawing Sheets

FIG. 9

JOB CHECKING
SAME TRANSMITTING IN ORDER 0001

·FILE NAME:Basic specifications1234567890
·FILE NAME: A4    ·IMAGE QUALITY  600×600dpi
                  /RESOLUTION:
·FORMATION DATE: 2002/08/05 15:30  ·PAGE NUMBER:10

OK
REOPERATION
1/2
DESTINATION LIST
COMMUNICATION ERROR
FILE

55

DATA COMMUNICATION SYSTEM CONTROLLING AVAILABLE ADDRESSEES FOR DATA BASED ON PRESELECTED SECURITY LEVEL OF USER AND ADDRESSEE LOCATION

CROSS-REFERENCE TO RELATED APPLICATIONS

This Nonprovisional application claims priority under 35 U.S.C. §119(a) on Patent Application No. 2008-9660 filed in Japan on Jan. 18, 2008, the entire contents of which are hereby incorporated by reference.

BACKGROUND OF THE INVENTION

1. Technical Field

The present invention relates to: a data communication system provided with an authentication device and with a data transmitting apparatus that is connected in a manner permitting communication with the authentication device and that provides a restricted function corresponding to a user authenticated by the authentication device; and a data transmitting apparatus employed in this data communication system.

2. Description of Related Art

In recent years, multi-functional machines are used widely in which functions such as copying and printing are combined with various communication functions so that facsimile communication and e-mail transmission and reception are made available. Data read by a multi-functional machine by means of a scanner function can be printed on recording paper or alternatively transmitted by facsimile transmission through a telephone line. In addition, the data can be transmitted broadly to a network in the data form of an attached file of an e-mail or the like.

On the other hand, apart from the copying function, the printing function, and the facsimile function of the multi-functional machines, ordinary users do not sufficiently understand the variety of functions in multi-functional machines in practice. Thus, a concern is present that read-out data is transmitted carelessly so that secret data is leaked to a third party by a destination specification error or a data selection error.

In order to avoid such situations, Japanese Patent Application Laid-Open No. 2007-49327 discloses a technique that a user having undergone LDAP (Lightweight Directory Access Protocol) authentication specifies addressees, and then registered destination information is obtained automatically. Further, Japanese Patent Application Laid-Open No. 2004-104180 proposes a technique in which in a case that erroneous transmission is avoided by transmission restriction such as closed area connection, the transmission restriction can temporarily be removed by password authentication when emergency arises or alternatively when the transmission restriction need be removed for a particular user.

BRIEF SUMMARY OF THE INVENTION

Nevertheless, in the technique disclosed in Japanese Patent Application Laid-Open No. 2007-49327, the authenticated user is allowed to perform transmission to arbitrary destinations obtained from the LDAP server. Thus, a possibility is present that destinations are selected erroneously and hence secret data is transmitted to unintended destinations. Further, in the technique disclosed in Japanese Patent Application Laid-Open No. 2004-104180, a possibility is present that the authenticated user performs erroneous transmission when the restriction is removed.

The present invention has been devised in view of such situations. An object of the present invention is to provide a data communication system and a data transmitting apparatus in which a security level and destinations stored in advance are obtained in correspondence to an authenticated user, and then the user having a security level not lower than a predetermined threshold value is allowed to perform transmission only to secured destinations.

The data communication system according to a first aspect is a data communication system comprising: an authentication device having authentication means for performing authentication of a user, and first storage means for storing destinations of a plurality of addressees; and a data transmitting apparatus that is connected in a manner permitting communication with the authentication device and that has first obtaining means for obtaining from the authentication device a destination of an addressee corresponding to a user when the user is authenticated successfully by the authentication device, and transmitting means for transmitting data to an obtained destination; wherein the authentication device has second storage means for storing security levels assigned individually to a plurality of users, and the data transmitting apparatus has second obtaining means for obtaining from the authentication device a security level of the authenticated user when the user is authenticated successfully by the authentication device; and wherein when the security level obtained by the second obtaining means is not lower than a first threshold value, the first obtaining means obtains a destination in which the authenticated user oneself is adopted as an addressee.

The data transmitting apparatus according to the first aspect is a data transmitting apparatus comprising: first obtaining means for obtaining a destination of an addressee corresponding to a user; and transmitting means for transmitting data to the obtained destination; wherein second obtaining means for obtaining a security level of the user is provided; and wherein when the security level obtained by the second obtaining means is not lower than a first threshold value, the first obtaining means obtains a destination in which the user oneself is adopted as an addressee.

In the first aspect, the first storage means of the authentication device stores in advance the destinations of a plurality of addressees including the user oneself. Further, the second storage means stores the security levels assigned to a plurality of users. The data transmitting apparatus is connected in a manner permitting communication with the authentication device. When a user is authenticated successfully by the authentication device, the second obtaining means obtains from the authentication device the security level of the authenticated user. Then, when the obtained security level is not lower than the first threshold value, the first obtaining means obtains from the authentication device a destination in which the user oneself is adopted as the addressee. Thus, when the security level assigned to the user is not lower than the first threshold value, the user's own destination is obtained as the restricted destination from the authentication device to the data transmitting apparatus. When, the security level is lower than the first threshold value, for example, the destination of an addressee specified by the user is obtained from the authentication device to the data transmitting apparatus. Then, data is transmitted to each of the obtained destinations.

The data communication system according to a second aspect is a data communication system according to the first aspect, wherein the data transmitting apparatus has display means for performing display concerning data transmission and restriction means for restricting/relaxing the display contents of the display means in accordance with high/low of the security level obtained by the second obtaining means.

The data transmitting apparatus according to the second aspect is a data transmitting apparatus according to the first aspect, further comprising: display means for performing display concerning data transmission; and restriction means for restricting/relaxing the display contents of the display means in accordance with high/low of the security level obtained by the second obtaining means.

In the second aspect, the display means performs display concerning data transmission. When a user is authenticated successfully by the authentication device, the restricting means restricts/relaxes the display contents provided by the display means, in accordance with the high/low of the user's security level obtained by the second obtaining means. Thus, when the security level assigned to the user is higher, a larger part of display contents concerning data transmission in data transmitting apparatus is changed into different one from the standard one like one displayed in a reduced density (so-called gray-out display). In association with this, the function concerning the display contents is restricted.

The data communication system or the data transmitting apparatus according to a third aspect is a data communication system or a data transmitting apparatus according to the second aspect, wherein the restriction/relaxation performed by the restriction means is switching of non-displaying/displaying.

In the third aspect, the restricting means switches non-displaying/displaying of the display contents provided by the display means, so as to restrict/relax the display contents provided by the display means. Thus, in accordance with the high/low of the security level assigned to a user, non-displaying/displaying of the display contents concerning data transmission in the data transmitting apparatus is switched. Thus, when the security level assigned to the user is higher, a larger part of display contents concerning data transmission becomes into a non-displayed state, and hence, for example, operation concerning the screen not displayed is restricted.

The data communication system according to a fourth aspect is a data communication system according to the second or the third aspect, wherein: the data transmitting apparatus has reception means for receiving operation concerning display contents when the restriction means relaxes the display contents; the display means provides display contents for allowing the reception means to receive setting of an addressee; when the security level obtained by the second obtaining means is lower than a second threshold value which is not lower than the first threshold value, the restriction means relaxes the display contents used for receiving setting of an addressee; and when the reception means receives setting of an addressee, the first obtaining means obtains from the authentication device the set-up destination of the addressee.

The data transmitting apparatus according to the fourth aspect is a data transmitting apparatus according to the second or the third aspect, further comprising reception means for receiving operation concerning display contents when the restriction means relaxes the display contents, wherein: the display means provides display contents for allowing the reception means to receive setting of an addressee; when the security level obtained by the second obtaining means is lower than a second threshold value which is not lower than the first threshold value, the restriction means relaxes the display contents used for receiving setting of an addressee; and when the reception means receives setting of an addressee, the first obtaining means obtains the set-up destination of the addressee.

In the fourth aspect, the reception means accepts operation concerning the display contents relaxed by the restricting means among the display contents provided by the display means. Then, after a user is authenticated successfully by the authentication device, when the user's security level obtained by the second obtaining means is lower than the second threshold value, the restricting means relaxes the display contents for allowing the reception means to receive setting of an addressee. Then, in a state that the display contents are relaxed, when the reception means receives setting of an addressee, the first obtaining means obtains from the authentication device the set-up destination of the addressee. As a result, when the assigned security level is not lower than the first threshold value and not lower than the second threshold value, the user is allowed to perform transmission only to the user's own destination. When the assigned security level is not lower than the first threshold value and lower than the second threshold value, the user is allowed to perform transmission to the user's own destination and the destination of the addressee having been set up by the user. Further, when the assigned security level is lower than the first threshold value, the user is allowed to perform transmission to the destination of the addressee having been set up by the user. This suppresses transmission to the destination of an addressee erroneously set up other than to the user's own destination.

The data communication system or the data transmitting apparatus according to a fifth aspect is a data communication system or a data transmitting apparatus according to the fourth aspect, wherein: the display means provides display contents for allowing the reception means to receive setting of a destination; when the security level obtained by the second obtaining means is lower than a third threshold value which is not higher than the second threshold value, the restriction means relaxes the display contents used for receiving setting of a destination; and when the reception means receives setting of a destination, the transmitting means transmits data to the set-up destination.

In the fifth aspect, after a user is authenticated successfully by the authentication device, when the user's security level obtained by the second obtaining means is lower than the third threshold value, the restricting means relaxes the display contents for allowing the reception means to receive setting of a destination. Then, in a state that the display contents are relaxed, when the reception means receives setting of a destination, the transmitting means transmits the data to the set-up destination. As a result, when the assigned security level is lower than the second threshold value and not lower than the third threshold value, the user is allowed to perform transmission at least to the destination of the addressee having been set up by the user. When the assigned security level is lower than the second threshold value and lower than the third threshold value, the user is allowed to perform transmission at least to the destination of the addressee having been set up by the user and the destination having been set up by the user. Further, when the assigned security level is not lower than the second threshold value, the user is allowed to perform transmission only to the user's own destination. This suppresses transmission to destinations of addressees having been set up erroneously or alternatively destinations having been set up erroneously, other than to the user's own destination.

The data communication system according to a sixth aspect is a data communication system according to the fourth or the fifth aspect, wherein: the data transmitting apparatus has registration means for registering a destination; the display means provides display contents for allowing the reception means to receive selection of a destination registered in the registration means; when the security level obtained by the second obtaining means is lower than a fourth threshold value which is not higher than the second threshold value, the restriction means relaxes the display contents used for receiving selection of a destination; and when the reception means receives selection of a destination, the transmitting means transmits data to the selected destination.

The data transmitting apparatus according to the sixth aspect is a data transmitting apparatus according to the fourth or the fifth aspect, further comprising registration means for registering a destination, wherein: the display means provides display contents for allowing the reception means to receive selection of a destination registered in the registration means; when the security level obtained by the second obtaining means is lower than a fourth threshold value which is not higher than the second threshold value, the restriction means relaxes the display contents used for receiving selection of a destination; and when the reception means receives selection of a destination, the transmitting means transmits data to the selected destination.

In the sixth aspect, the registration means registers a plurality of destinations. Then, after a user is authenticated successfully by the authentication device, when the user's security level obtained by the second obtaining means is lower than the fourth threshold value, the restricting means relaxes the display contents for allowing the reception means to receive selection of a destination. Then, in a state that the display contents are relaxed, when the reception means receives selection of a destination, the transmitting means transmits the data to the selected destination. As a result, when the assigned security level is lower than the second threshold value and not lower than the fourth threshold value, the user is allowed to perform transmission at least to the destination of the addressee having been set up by the user. When the assigned security level is lower than the second threshold value and lower than the fourth threshold value, the user is allowed to perform transmission at least to the destination of the addressee having been set up by the user and the destination having been selected by the user. Further, when the assigned security level is not lower than the second threshold value, the user is allowed to perform transmission only to the user's own destination. This suppresses transmission to destinations of addressees having been set up erroneously or alternatively destinations having been selected erroneously, other than to the user's own destination.

According to the present invention, when the security level assigned to a user is not lower than a predetermined threshold value (a first threshold value), the user's own destination is obtained as a restricted destination from the authentication device. When, the security level is lower than the predetermined threshold value, for example, the destination of an addressee specified by the user is obtained. Then, data is transmitted to each of the obtained destinations. Thus, a user having a security level not lower than a predetermined threshold value is allowed to perform transmission to a secured destination.

Thus, for example, a low utilization right (a high security level) may be imparted to a user (GUEST) who has a temporary account, so that leakage of secret data can be avoided and hence the security can be improved. Further, when the security level assigned to a user is not lower than a predetermined threshold value, data transmission may be performed such that data to be transmitted is once transmitted from a data transmitting apparatus to the user's own personal computer and then transmitted to the addressee after the checking of the data. This avoids an error in the data to be transmitted and/or an error in the destination.

The above and further objects and features of the invention will more fully be apparent from the following detailed description with accompanying drawings.

BRIEF DESCRIPTION OF THE SEVERAL VIEWS OF THE DRAWINGS

FIG. 9 is an explanation diagram showing an example of a screen used when details of a job history are to be referred to;

FIG. 13 is an explanation diagram showing a global address search screen in which an addressee is searched for;

DETAILED DESCRIPTION OF THE INVENTION

The present invention is described below in detail with reference to the drawings showing an embodiment. The present embodiment is described for a case that the data transmitting apparatus is a multi-functional machine and that the authentication device is an LDAP server.

Figure 1:
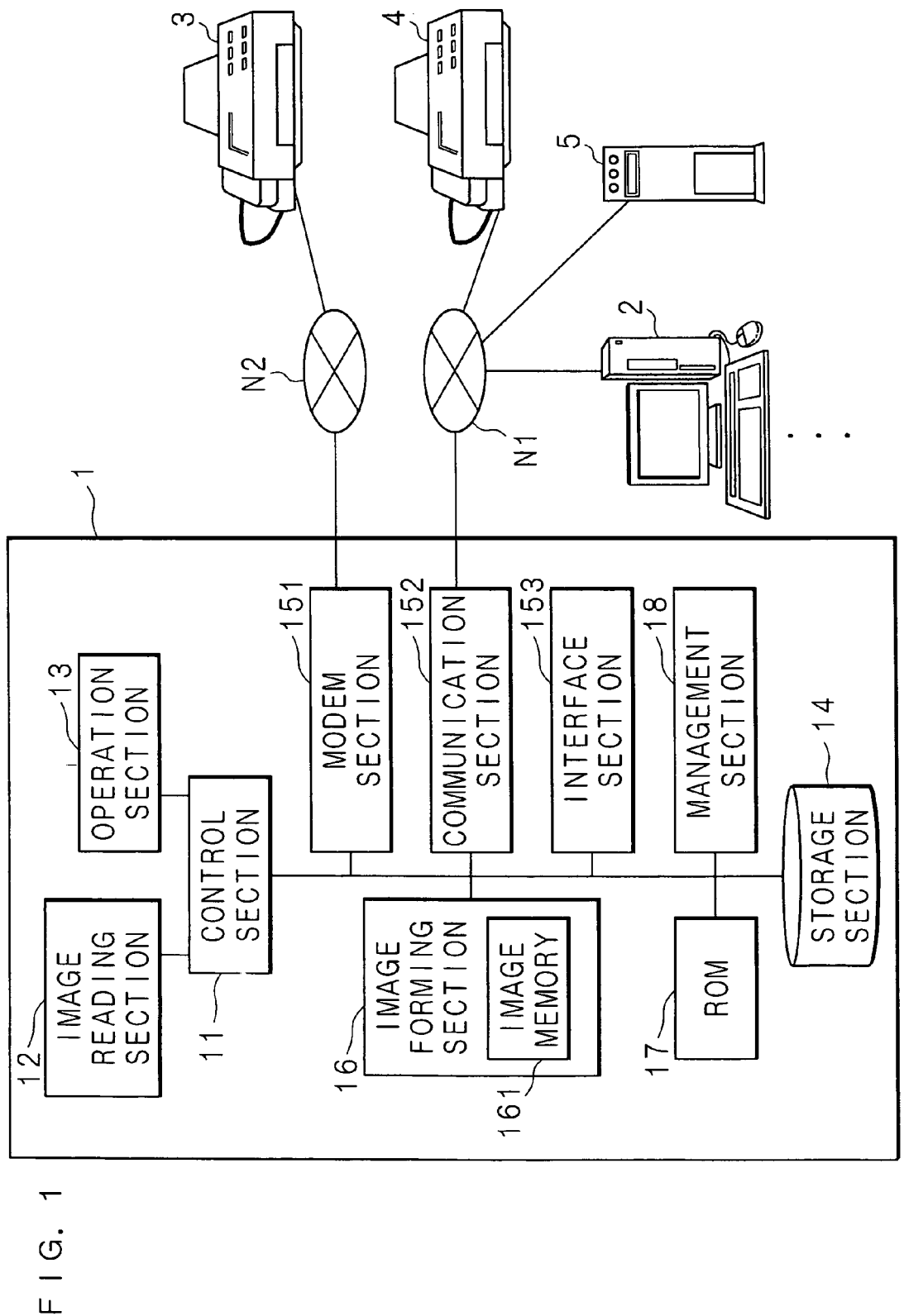
FIG. 1 is a block diagram showing a configuration of a data transmitting apparatus according to an embodiment of the present invention.

FIG. 1 is a block diagram showing a configuration of a data transmitting apparatus according to an embodiment of the present invention. In the figure, numeral 1 indicates a multi-functional machine installed in a store such as a convenience store, a stationery store, and a supermarket. Numeral 5 indicates an LDAP server connected to the multi-functional machine 1 via a communication network N1.

The multi-functional machine 1 has a control section 11 provided with a CPU for performing arithmetic operation and the like and with a RAM for storing information generated temporarily. The control section 11 is connected via a bus to: a storage section 14 composed of a hard disk or a nonvolatile memory; an image forming section 16 for forming an image from image data and then recording the image; a ROM 17 for storing information, such as a control program; a management section 18 composed of a memory for storing management information used for managing the processing performed by the multi-functional machine 1; a modem section 151 for performing facsimile communication; a communication section 152 for establishing connection to a communication network such as the Internet; and the interface section 153 for establishing connection to other devices. Further, an input/output interface of the control section 11 is connected to: an image reading section 12 for scanning a manuscript so as to generate image data; and an operation section 13 for receiving operation.

In accordance with the control program stored in the ROM 17 in advance, the control section 11 executes the processing of input/output control, arithmetic operation, and the like with reference to the management information stored in the management section 18, so as to serve as a control center of the multi-functional machine 1.

Figure 2:
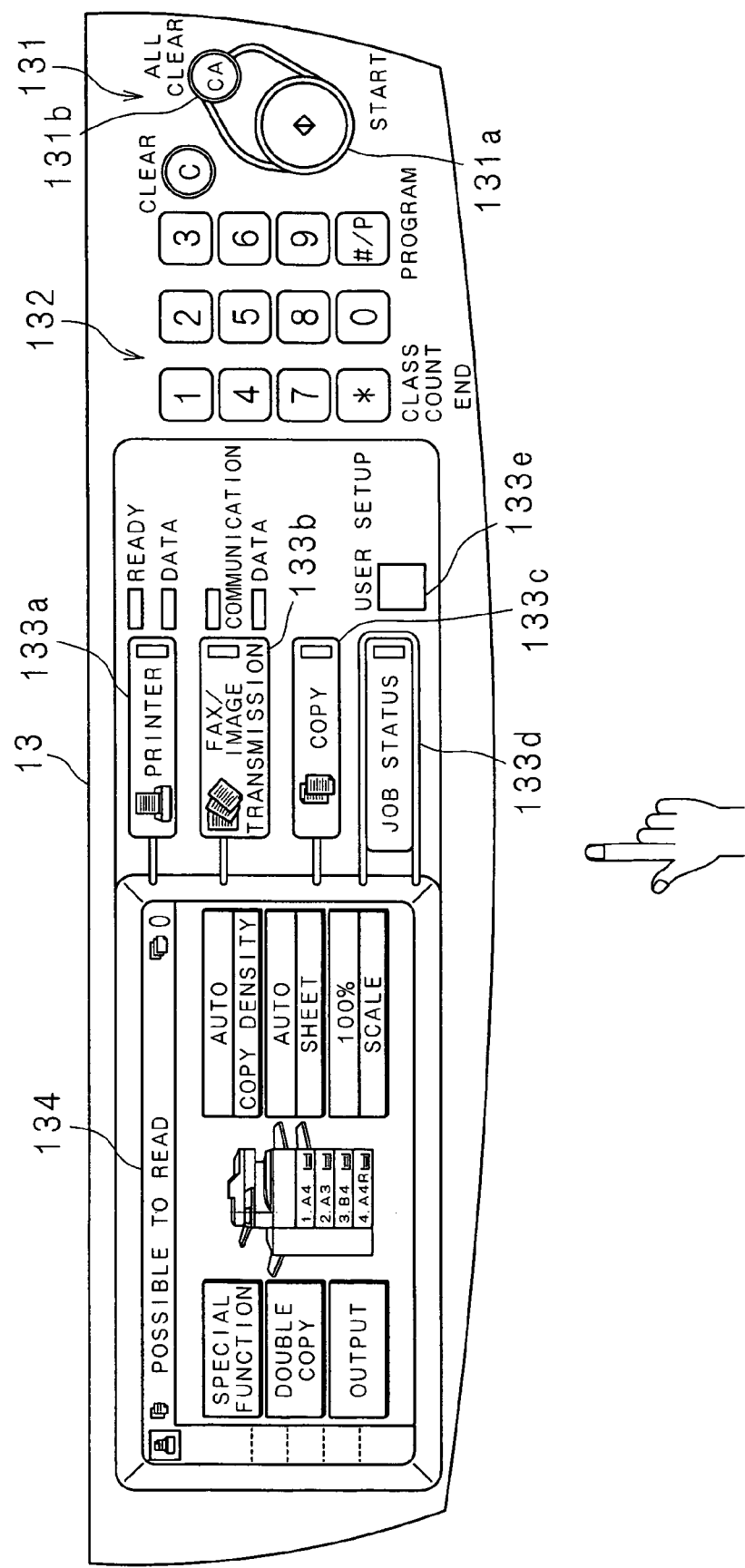
FIG. 2 is an explanation diagram showing an external appearance of an operation section of a multi-functional machine.

The operation section 13 has: a display section such as a liquid crystal panel and LEDs for displaying information necessary in operation; and an input section such as a touch panel 134 and numeric keys 132 used for inputting information concerning operation (see FIG. 2). The inputted information is received by the control section 11. The storage section 14 stores the image data obtained by the image reading section 12, the modem section 151, the communication section 152, and the interface section 153.

The image forming section 16 has an image memory 161 for temporarily storing image data transferred from the storage section 14. Then, the image forming section 16 forms an image from the image data stored in the image memory 161, and then records the image on recording paper. Thus, the multi-functional machine 1 serves as a copying apparatus for copying a manuscript.

The modem section 151 is connected to an external facsimile apparatus 3 via a public network N2. The modem section 151 transmits image data generated by the image reading section 12 reading a document, to the external facsimile apparatus 3 by facsimile communication. The modem section 151, further, receives image data transmitted from the external facsimile apparatus 3 by facsimile communication. The received image data is outputted by the image forming section 16 onto recording paper. Thus, the multi-functional machine 1 serves as a facsimile machine for transmitting and receiving a document.

The communication section 152 is connected to an information processing apparatus 2 such as an external server apparatus and a personal computer (PC), a facsimile apparatus 4, and an LDAP server 5 the communication section 152 via the communication network N1 such as the Internet. The image data generated by the image reading section 12 is transmitted to the external information processing apparatus 2 in the form of an attached file of an e-mail or a transfer file of FTP (File Transfer Protocol), or alternatively transmitted to the external facsimile apparatus 4 in the form of facsimile image data. When operation that specifies the external information processing apparatus 2 or the facsimile apparatus 4 is received, the communication section 152 receives image data from the specified apparatus, and then the received image data is outputted by the image forming section 16 onto recording paper. Thus, the multi-functional machine 1 serves as a mail transmitting apparatus, an image data transmitting and receiving apparatus, an Internet facsimile machine, and a network printer apparatus.

Further, the control section 11 requests authentication of a user, obtaining of the user's security level, and search of an addressee, to the LDAP server 5 via the communication section 152. Then, as a response to each request, the control section 11 obtains a result of user authentication, a user's security level, and an addressee's destination (including a user's own destination).

The interface section 153 is connected to devices such as a PC and a memory card. Image data obtained by the interface section 153 from the device connected to this is outputted by the image forming section 16 onto recording paper, or alternatively transmitted by the modem section 151 or the communication section 152 to the external facsimile apparatus 3 or 4 or the information processing apparatus 2. Further, the image data generated by the image reading section 12 reading a document is outputted through the interface section 153 to a device such as a PC and a memory card connected to the interface section 153. Thus, the multi-functional machine 1 serves as a printer apparatus, a facsimile machine (or an Internet facsimile machine), a mail transmitting apparatus, and a scanner.

FIG. 2 is an explanation diagram showing an external appearance of the operation section 13 of the multi-functional machine 1. The operation section 13 has: main keys 131 composed of a start key 131a and an all-clear key 131b; numeric keys 132; a printer key 133a; a FAX/image transmission key 133b; a copy key 133c; a job status key 133d; a user setup key 133e; and a touch panel 134 composed of a liquid crystal panel. The printer key 133a, the FAX/image transmission key 133b, the copy key 133c, and the job status key 133d are keys each used for requesting that a GUI (graphical user interface) concerning the function assigned to the key should be displayed on the touch panel 134. The user setup key 133e is a key for requesting that the display screen on the touch panel 134 should be changed into a user setup screen.

When a user is to transmit image data by facsimile communication, mail transmission, or data transmission, the user presses the FAX/image transmission key 133b and then performs predetermined input through the touch panel 134 so that user authentication is performed before the data transmission. Here, the user authentication may be performed at an initial stage such as startup or reset of the multi-functional machine 1.

With reference to FIGS. 3 to 10, description is given below for display contents concerning data transmission in the multi-functional machine 1 in a case that in accordance with the security level assigned to a user, display contents concerning acceptance of setting of a destination are not restricted.

Figure 3:
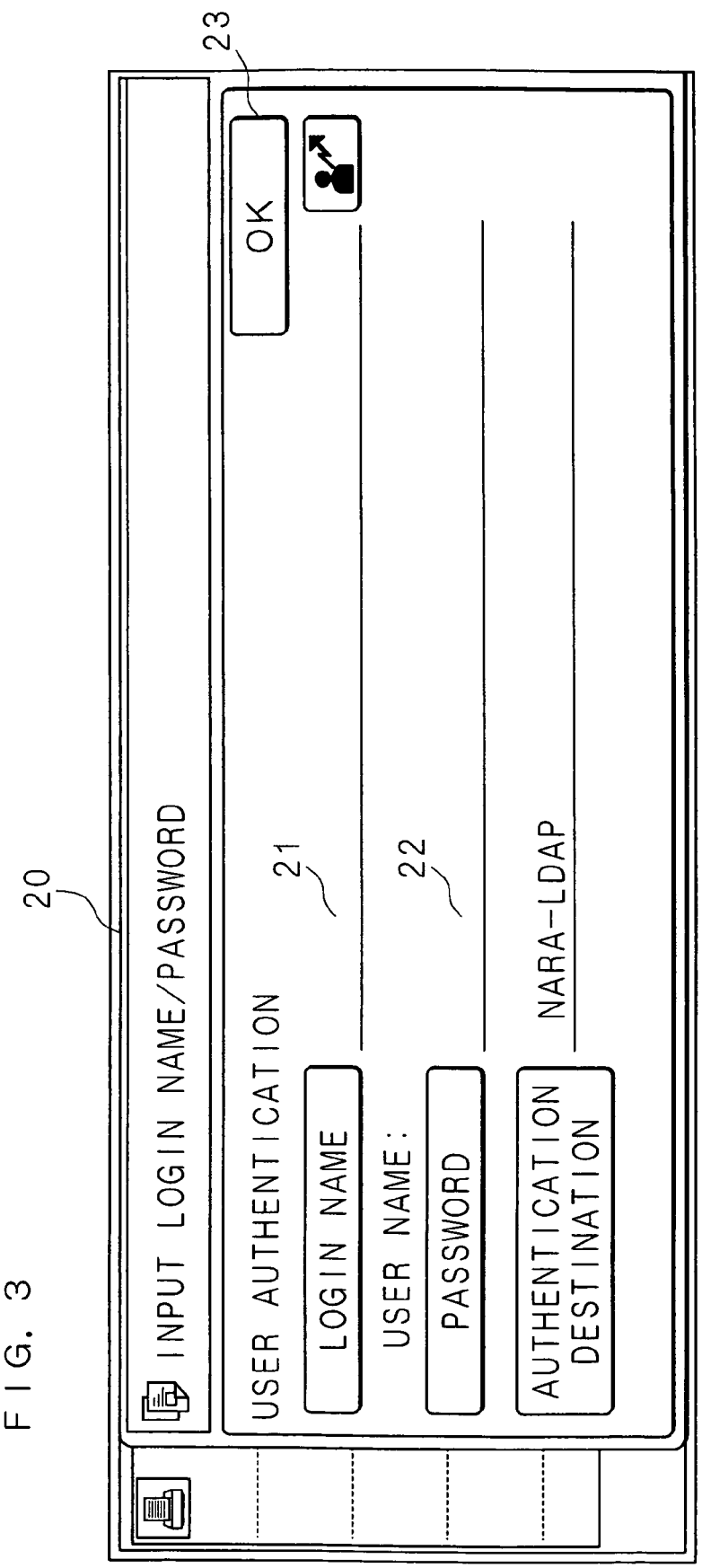
FIG. 3 is an explanation diagram of a screen displayed when user authentication is to be performed.

FIG. 3 is an explanation diagram of a screen displayed when user authentication is to be performed. When the FAX/image transmission key 133b of FIG. 2 is pressed, a user authentication screen 20 of FIG. 3 is displayed on the touch panel 134. On the user authentication screen 20, the user inputs one's own login name and password into a "login name" input field 21 and a "password" input field 22, and then presses an "OK" region 23. As a result, login into the LDAP server 5 and authentication by the LDAP server 5 are performed. In the present embodiment, the LDAP server 5 (NARA-LDAP server) connected to the communication network N1 performs authentication whether the user is one registered in advance, on the basis of the login name and the password having been inputted.

Figure 4:
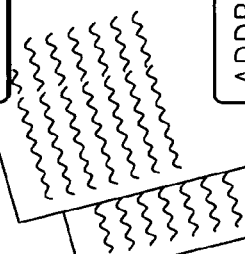
FIG. 4 is an explanation diagram showing an example of a screen displayed when authentication by an LDAP server is successful.

FIG. 4 is an explanation diagram showing an example of a screen displayed when authentication by the LDAP server 5 is successful. When a user having a name of "user 1" has logged in through the user authentication screen 20 of FIG. 3, an image sending screen 25 of FIG. 4 is displayed on the touch panel 134. In this case, the e-mail address of the user "user 1" authenticated by the LDAP server 5 is displayed in the header part 26 of the image sending screen 25. Further, as for the "density", the "resolution", the "format", and the "document" (size), standard setting values registered by the user in advance are set up automatically.

Figure 5:
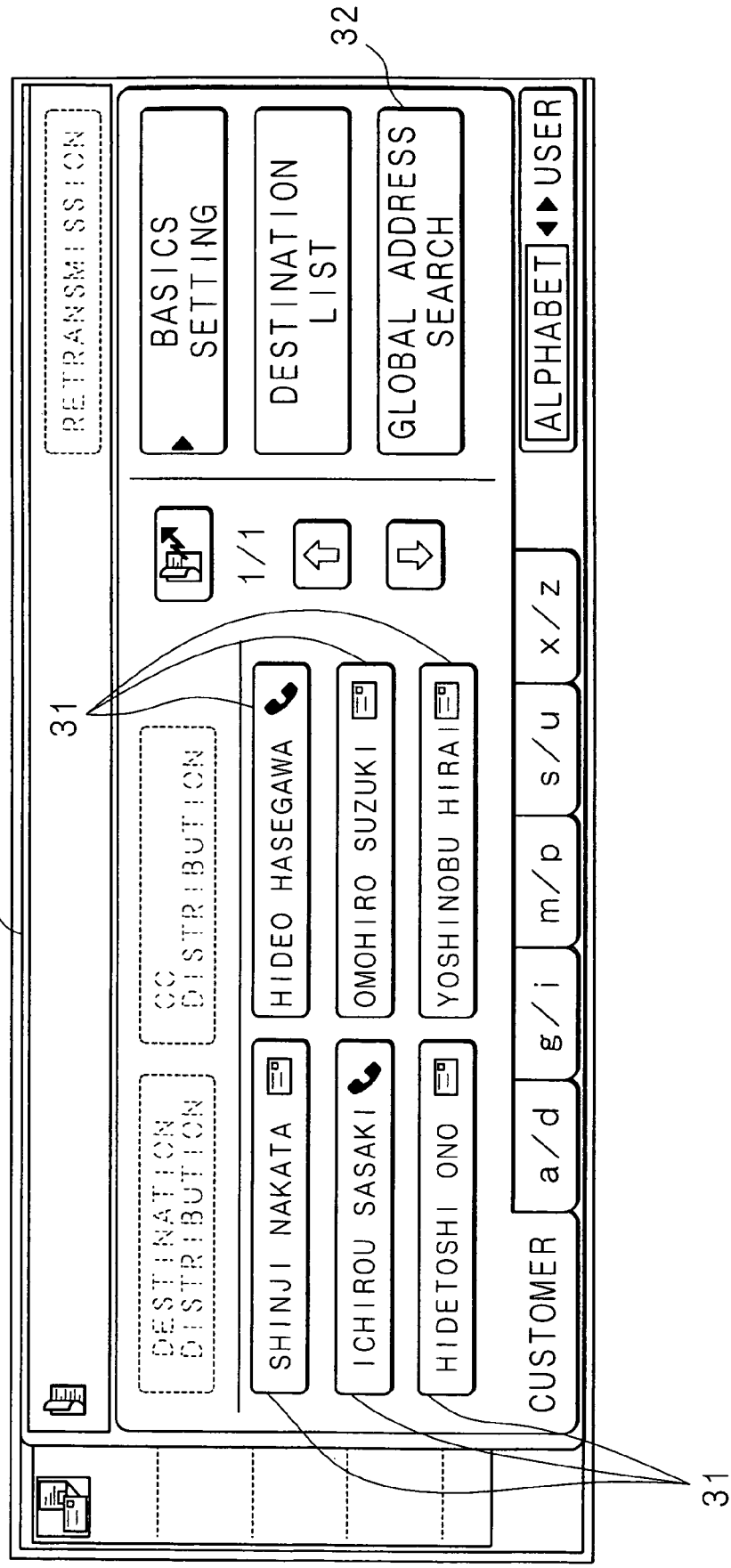
FIG. 5 is an explanation diagram showing an example of a screen displayed when an address book is selected.

FIG. 5 is an explanation diagram showing an example of a screen displayed when an address book is selected. When the "address book" region 27 is pressed on the image sending screen 25 of FIG. 4, a one-touch key screen 30 of FIG. 5 is displayed on the touch panel 134. When pressing the "one-touch key" region 31 on the one-touch key screen 30, the user is allowed to select a destination registered in the multi-functional machine 1. When search of an address is to be requested to the LDAP server 5, the "global address search" region 32 is used for requesting that the screen should be changed into that used for setting up an addressee serving as the object of search.

Figure 6:
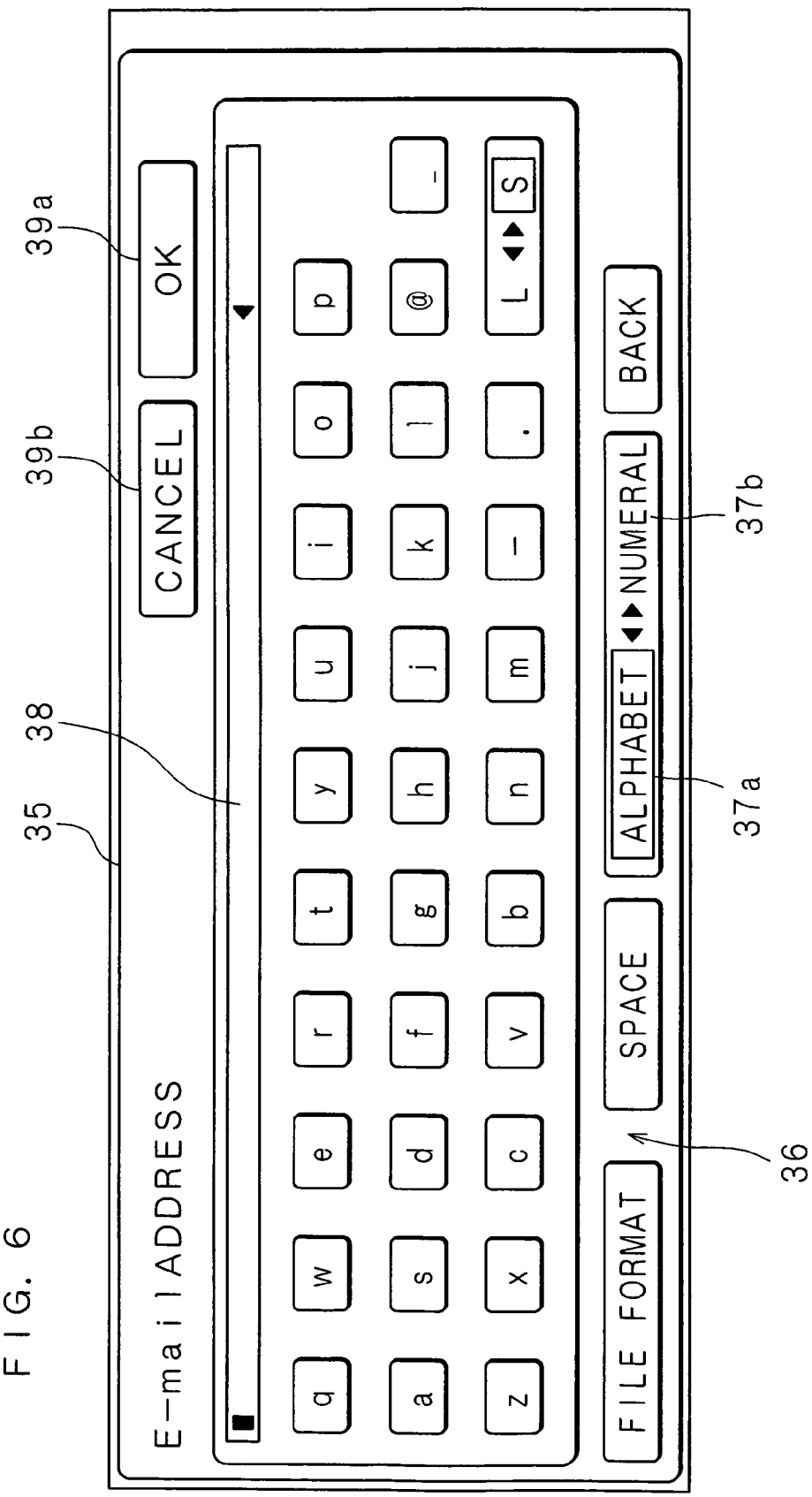
FIG. 6 is an explanation diagram showing an example of a screen displayed when address input is selected.

FIG. 6 is an explanation diagram showing an example of a screen displayed when address input is selected. When the "address input" region 28 is pressed on the image sending screen 25 of FIG. 4, an address input screen 35 of FIG. 6 is displayed on the touch panel 134. By using the softkeys 36 whose display is switched when the "alphabetic characters" region 37a/"numeric characters" region 37b is pressed on the address input screen 35, the user can set up an arbitrary mail address as a destination into the "e-mail address" input field 38.

Figure 7:
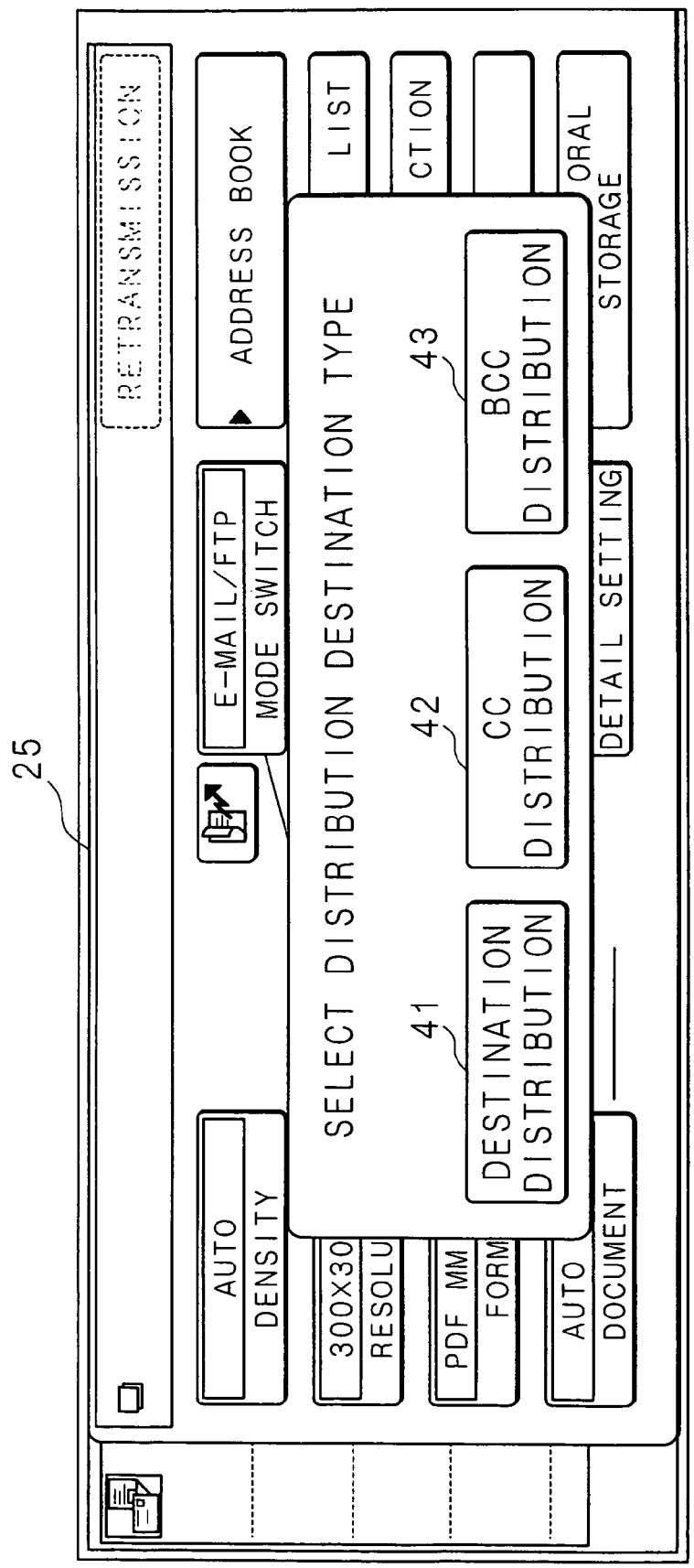
FIG. 7 is an explanation diagram showing an example of a screen used when a destination type is to be selected.

FIG. 7 is an explanation diagram showing an example of a screen used when a destination type is to be selected. When the "one-touch key" region 31 is pressed on the one-touch key screen 30 of FIG. 5, a distribution destination type selection screen 40 of FIG. 7 is displayed in a state overlapping on the image sending screen 25. Similar, on the address input screen 35 of FIG. 6, when the user sets up a mail address as a destination into the "e-mail address" input field 38 and then presses the "OK" region 39a, the distribution destination type selection screen 40 of FIG. 7 is displayed in a state overlapping on the address input screen 35. On the distribution destination type selection screen 40, the user presses any one of the "destination transmission" region 41, the "CC distribution" region 42, and the "BCC distribution" region 42, so as to select whether the set-up destination should be assigned to any one of "TO", "CC", and "BCC".

Figure 8:
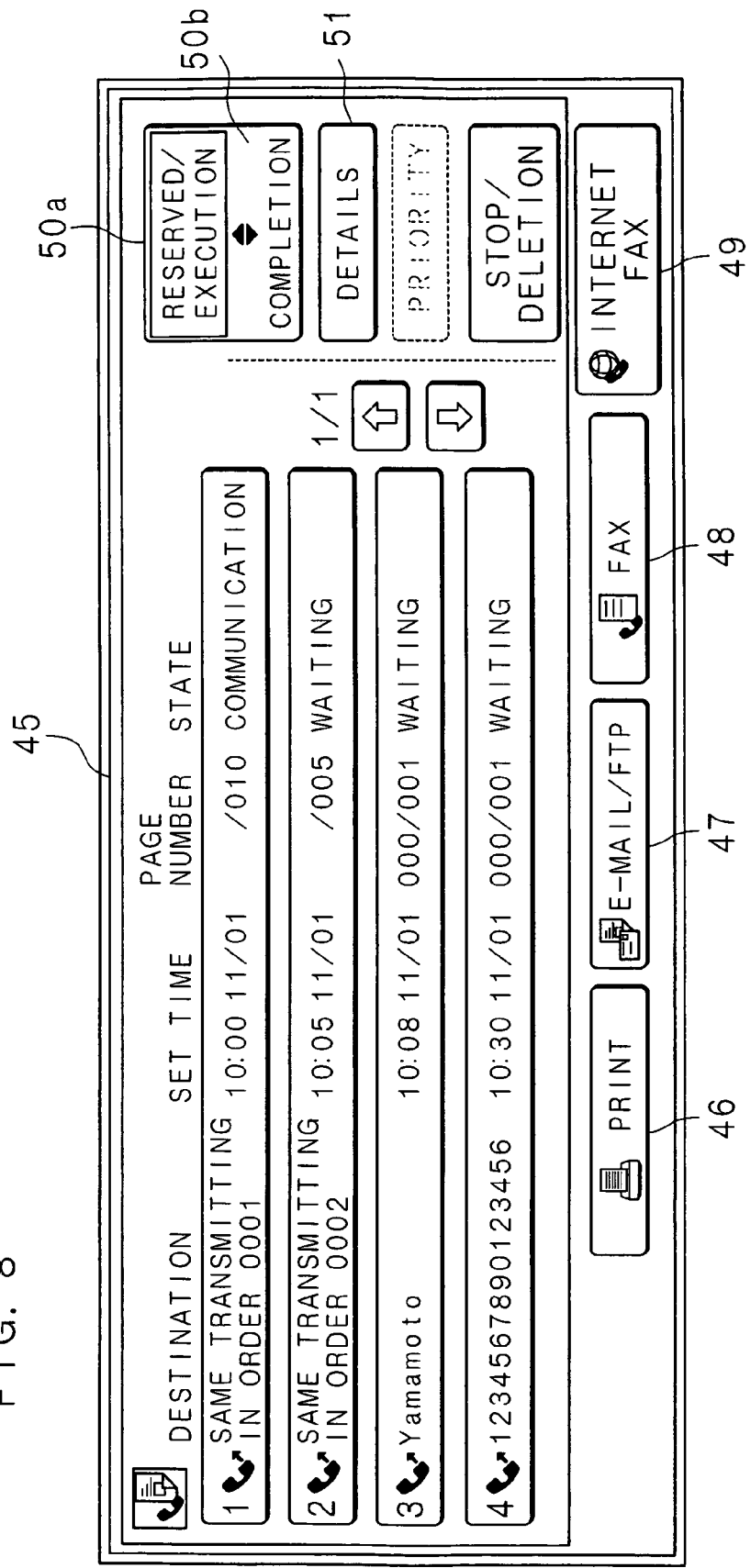
FIG. 8 is an explanation diagram showing an example of a screen used when a job history is to be referred to after a job such as printing and transmission is executed.

FIG. 8 is an explanation diagram showing an example of a screen used when a job history is to be referred to after a job such as printing and transmission is executed. When the job status key 133d is pressed on the operation section 13 of FIG. 2, a job history screen 45 of FIG. 8 is displayed on the touch panel 134. When pressing the "print" region 46, the "e-mail/FTP" region 47, the "fax" region 48, or the "Internet FAX" region 49 displayed in the lower part of the job history screen 45, the user can browse the processing status or the processing result of each job. The present embodiment shows an example of a case that the "fax" region 48 is pressed. Further, when pressing the "reserved/execution" region 50a and the "completion" region 50b in the upper right part of the job history screen 45, the user can separately browse process-waiting jobs and already processed jobs.

FIG. 9 is an explanation diagram showing an example of a screen used when details of a job history are to be referred to. When the "details" region 51 is pressed on the job history screen 45 of FIG. 8, a detailed job history screen 55 of FIG. 9 is displayed on the touch panel 134. This screen allows the user to check the details of processing status or processing result of a particular job.

With reference to FIGS. 10 to 13 as well as FIGS. 5 to 7 described above, description is given below for display contents concerning data transmission in the multi-functional machine 1 in a case that in accordance with the security level L4 to L1 assigned to a user, display contents concerning setting of an addressee, setting of a destination, and acceptance of selection of a destination are restricted.

Figure 10:
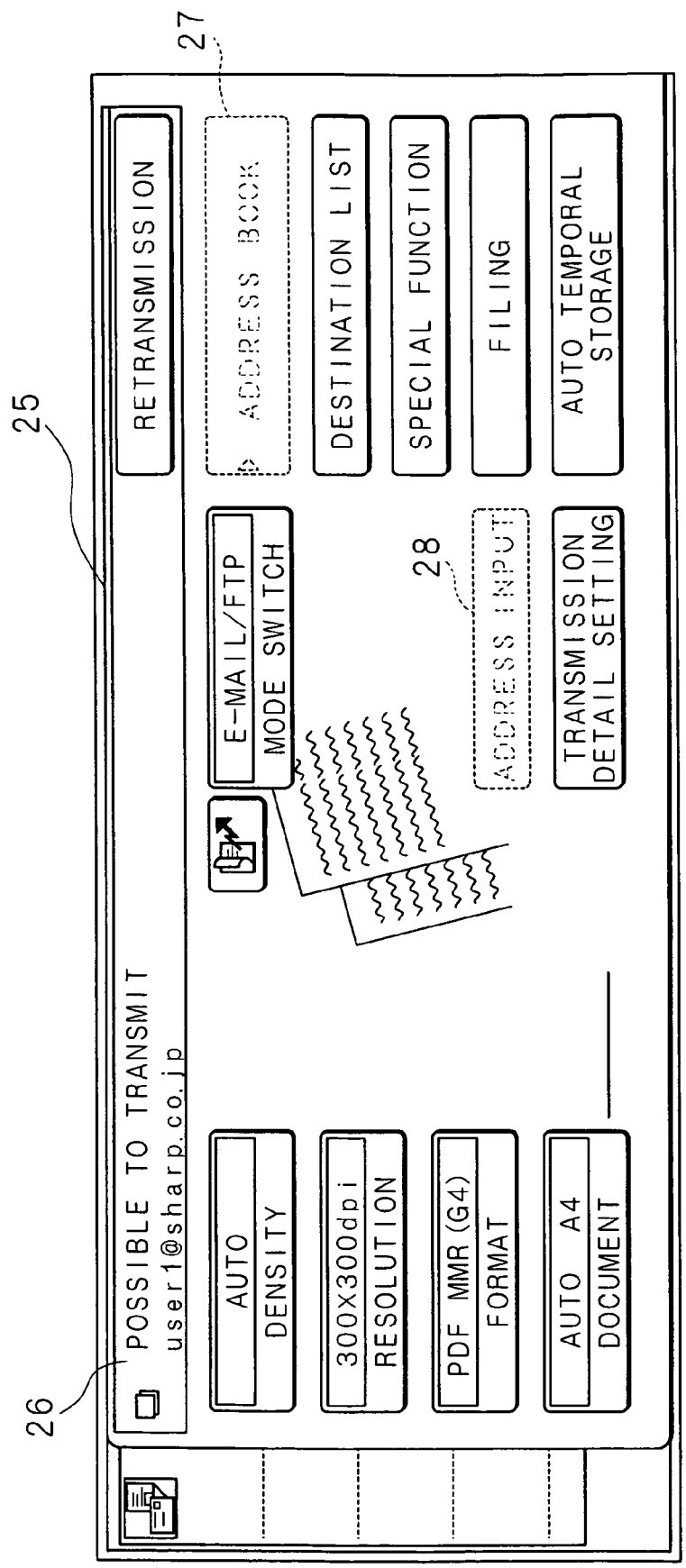
FIG. 10 is an explanation diagram showing an image sending screen displayed to a user having an assigned security level of L4 which is the highest among L4 to L1.

FIG. 10 is an explanation diagram showing an image sending screen 25 displayed to a user having an assigned security level of L4 which is the highest among L4 to L1. When a user having a name of "user 1" is authenticated successfully, similarly to the case of FIG. 4 described above, the e-mail address of "user 1" is displayed in the header part 26 of the image sending screen 25. In contrast, the "address book" region 27 and the "address input" region 28 are displayed in a reduced density, and hence the operation of changing the display contents to the one-touch key screen 30 of FIG. 5 or the address input screen 35 of FIG. 6 is restricted. This inhibits: selecting of a destination registered in each one-touch key of the address book on the one-touch key screen 30; and setting up of an arbitrary mail addresses as a destination on the address input screen 35. Also inhibited is performing global address search on the one-touch key screen 30 and thereby searching for an addressee registered in the LDAP server 5. In this case, the user cannot set up an extra destination, and hence can perform transmission only to the own destination displayed in the header part 26.

Figure 11:
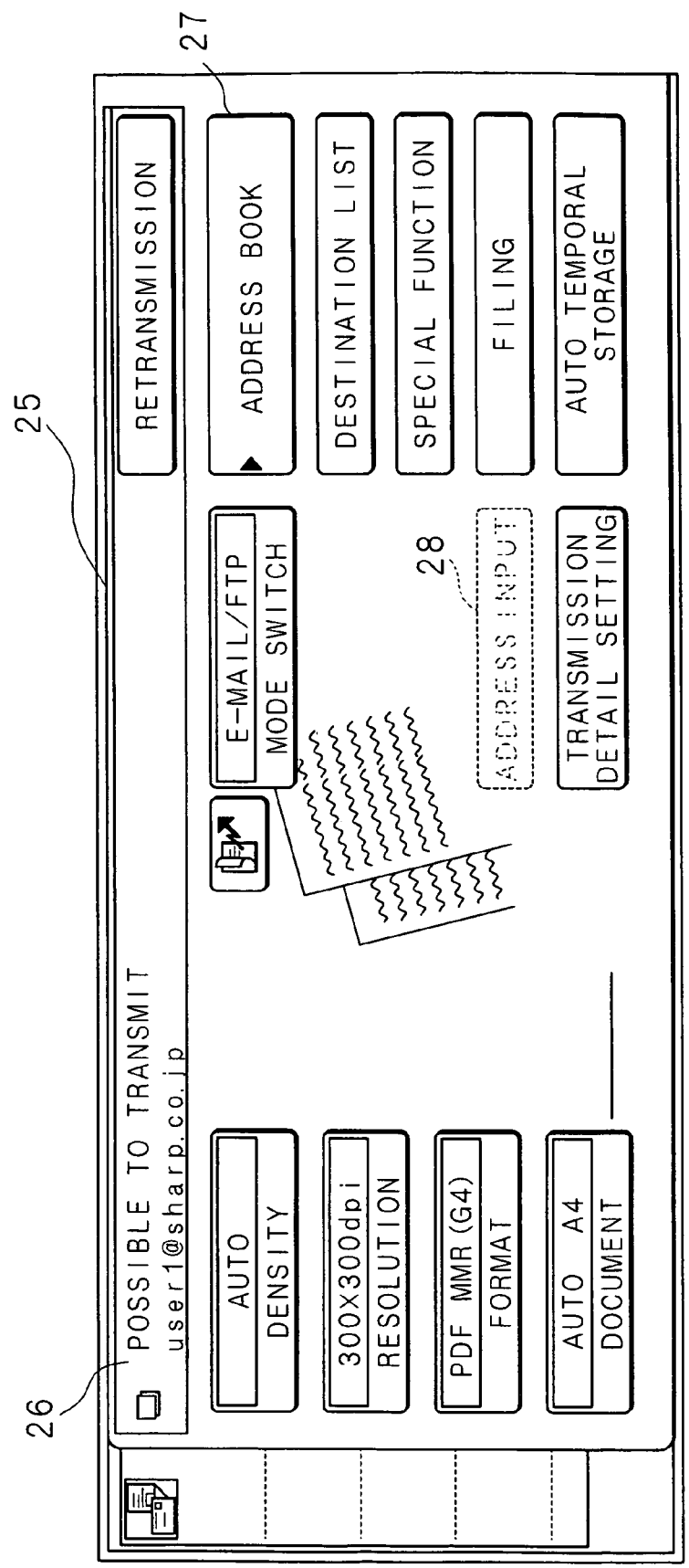
FIG. 11 is an explanation diagram showing an image sending screen displayed to a user having an assigned security level of L3 which is lower than L4 by one step (or of L2 which is lower than L4 by two steps)
Figure 12:
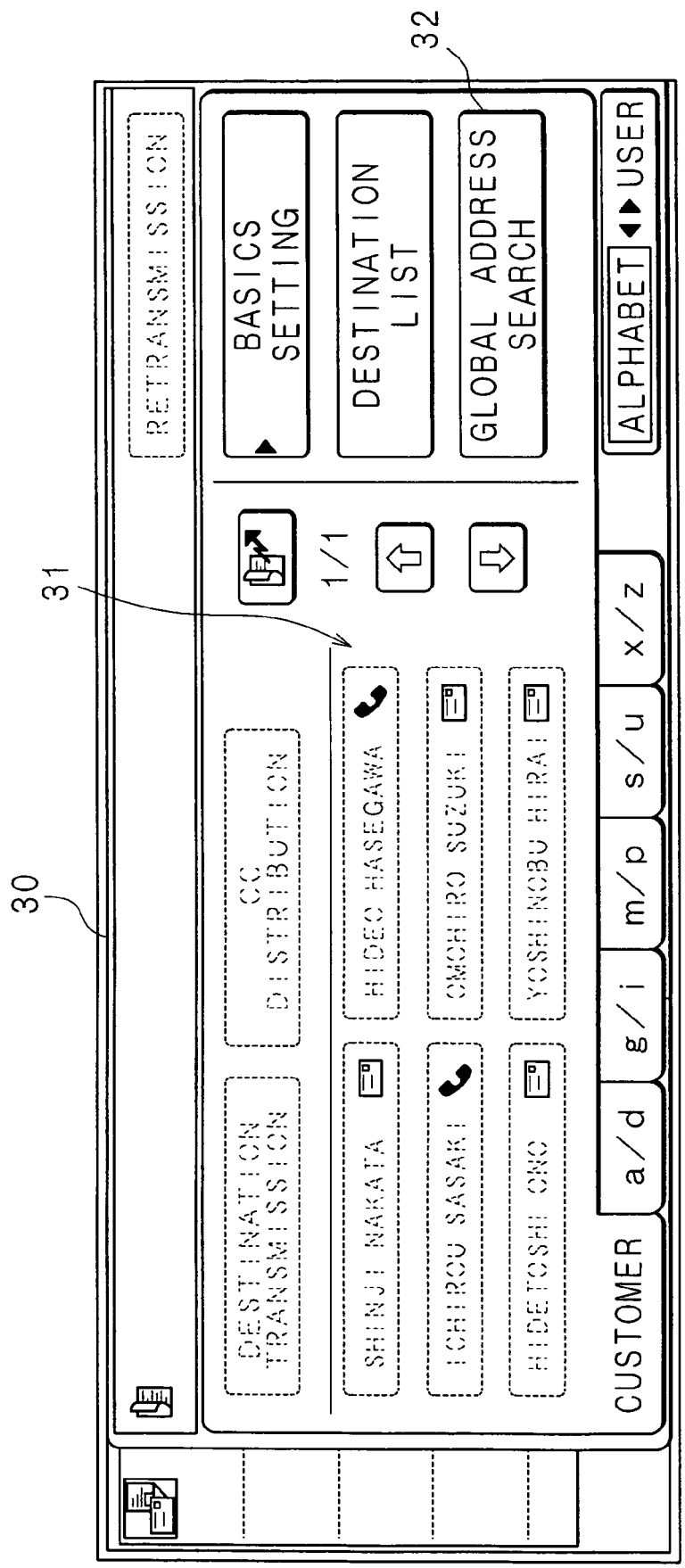
FIG. 12 is an explanation diagram showing a one-touch key screen in which a "one-touch key" region is displayed in a reduced density.
Figure 13:
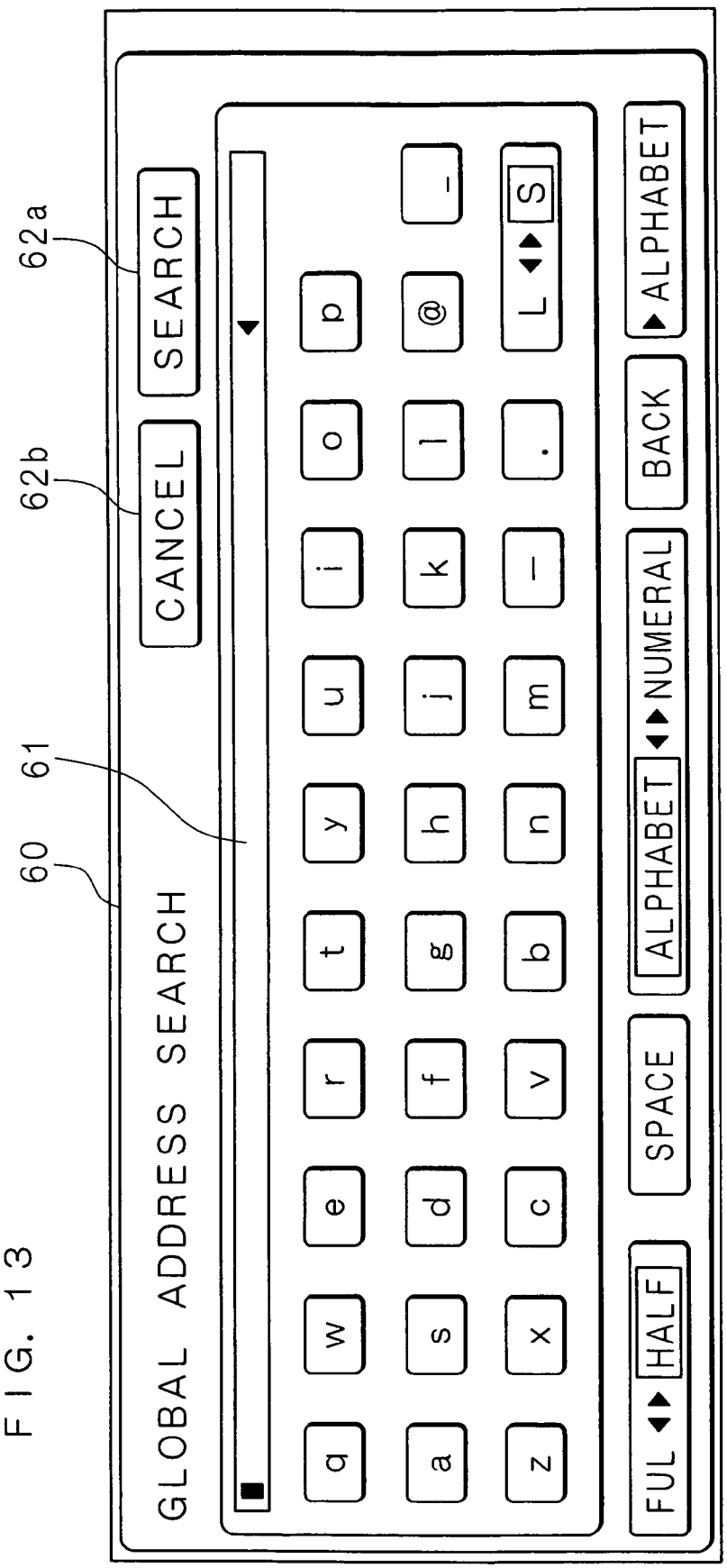
Figure 14:
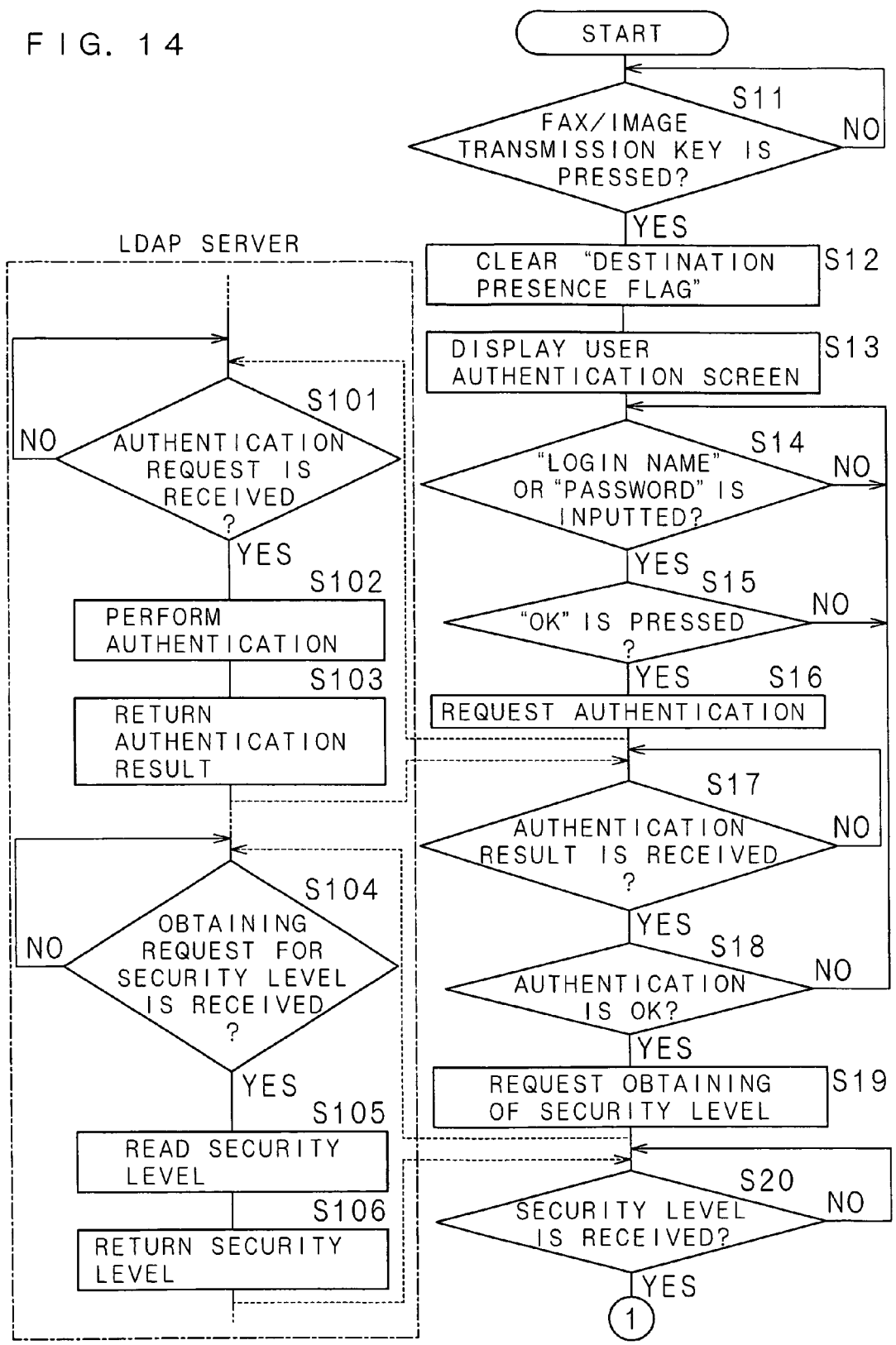
FIG. 14 is a flow chart showing: a processing procedure of a control section of a multi-functional machine serving as an embodiment of a data transmitting apparatus; and a processing procedure of an LDAP server serving as an embodiment of an authentication device in a data communication system according to the present invention.
Figure 15:
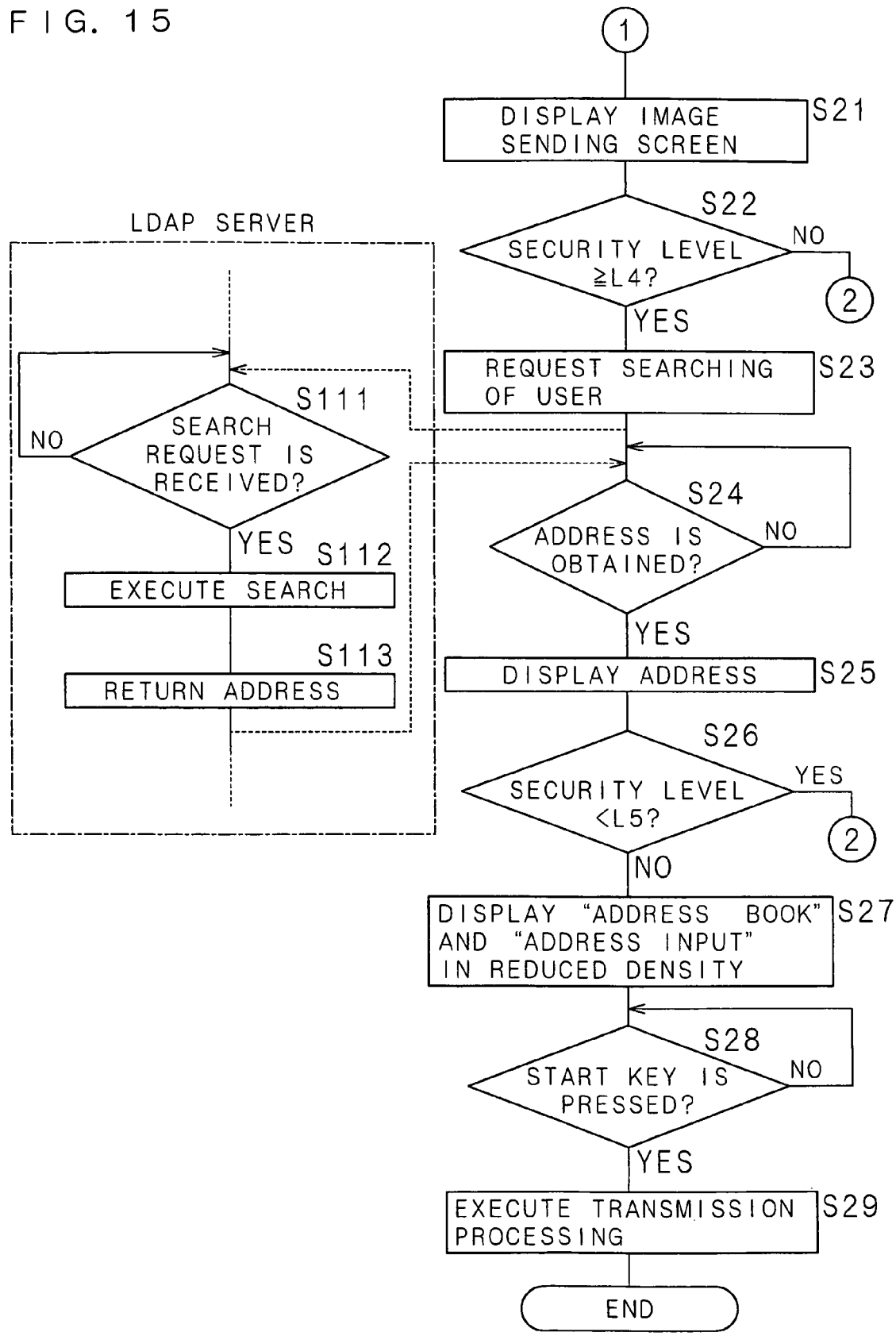
FIG. 15 is a flow chart showing a processing procedure of a control section of a multi-functional machine and a processing procedure of an LDAP server.
Figure 16:
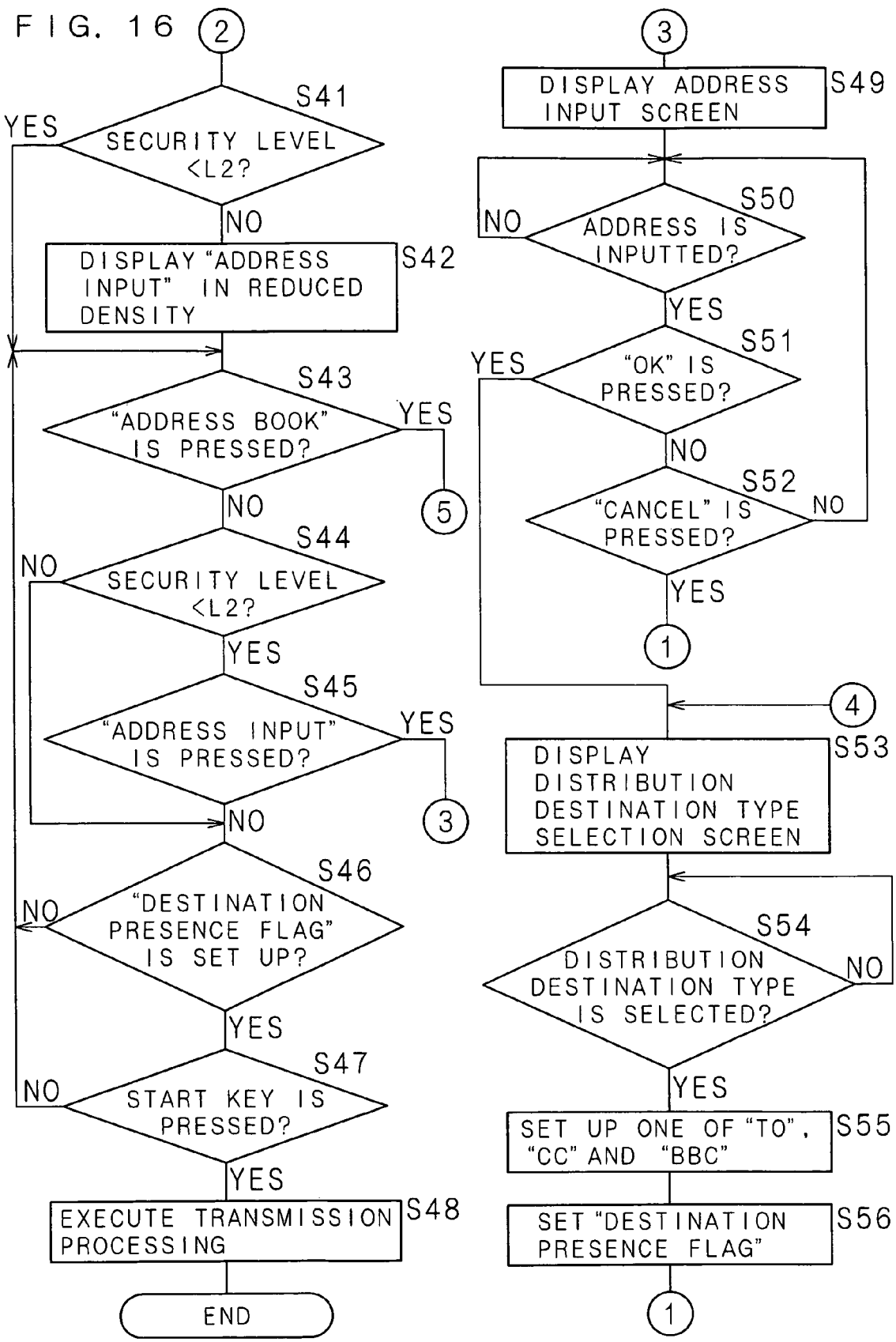
FIG. 16 is a flow chart showing a processing procedure of a control section of a multi-functional machine.
Figure 17:
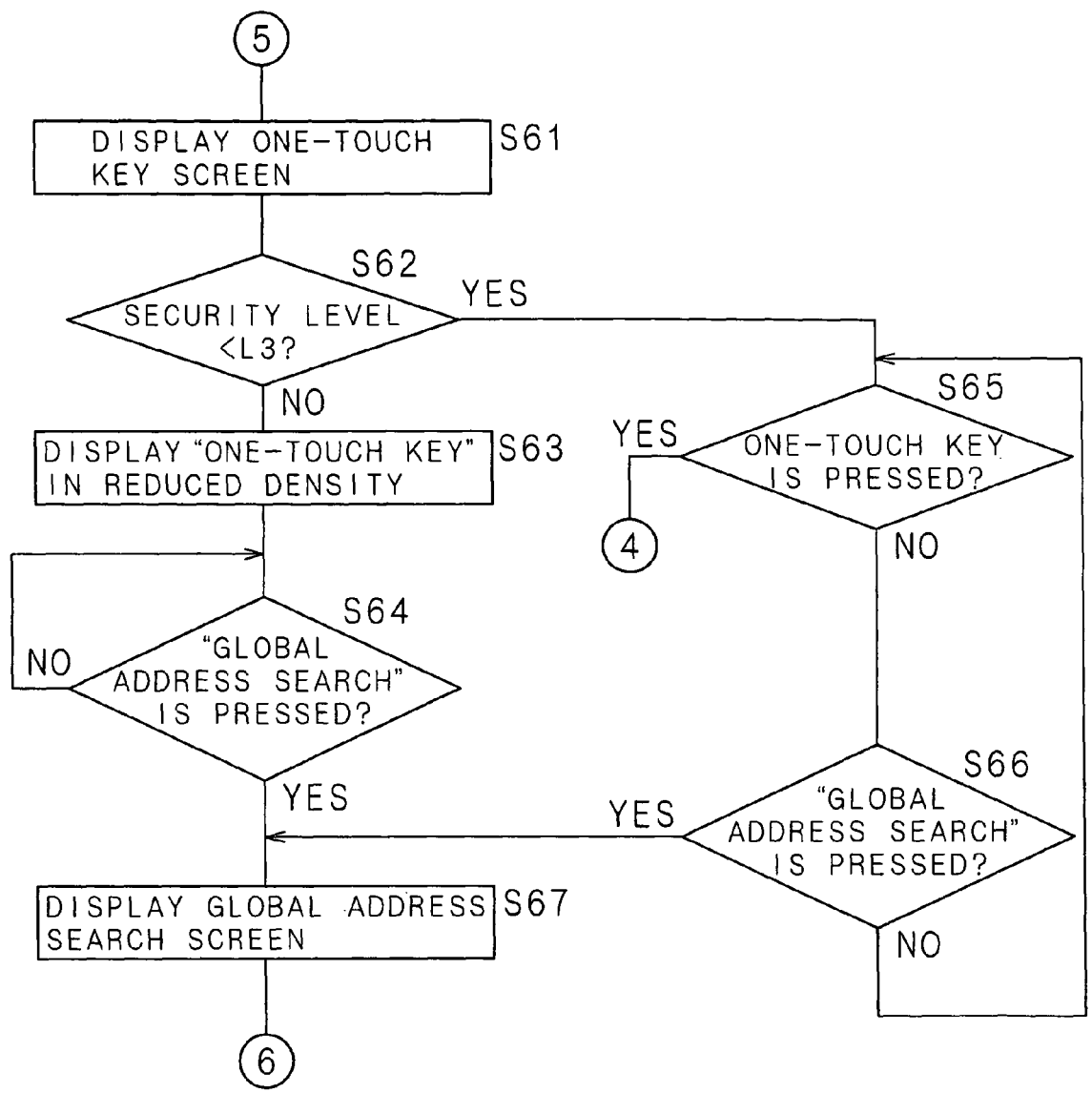
FIG. 17 is a flow chart showing a processing procedure of a control section of a multi-functional machine.
Figure 18:
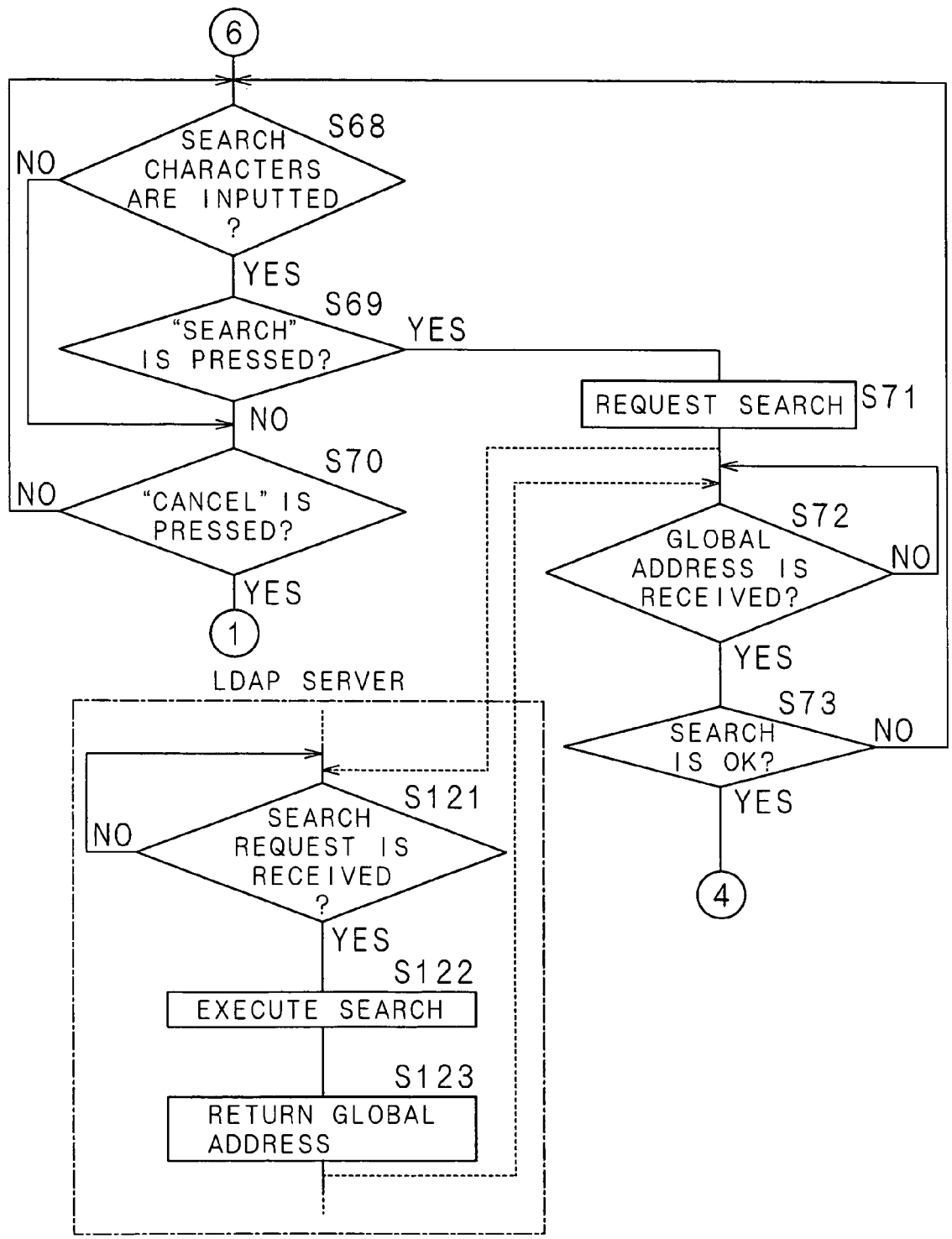
FIG. 18 is a flow chart showing a processing procedure of a control section of a multi-functional machine and a processing procedure of an LDAP server.

FIG. 11 is an explanation diagram showing an image sending screen 25 displayed to a user having an assigned security level of L3 which is lower than L4 by one step (or of L2 which is lower than L4 by two steps). Further, FIGS. 12 and 13 are explanation diagrams respectively showing: a one-touch key screen 30 in which the "one-touch key" region 31 is displayed in a reduced density; and a global address search screen 60 used for searching for an addressee. When a user having a security level of L3 and a name of "user 2" is authenticated successfully, the e-mail address of "user 2" is not displayed in the header part 26 of the image sending screen 25. However, the "address book" region 27 is displayed in a standard density. Thus, the user's operation of changing the display contents to the one-touch key screen 30 of FIG. 12 is acceptable. Further, the "address input" region 28 is displayed in a reduced density. Thus, the operation of changing the display contents to the address input screen 35 of FIG. 6 is restricted.

Further, although operation to the "one-touch key" region 31 displayed in a reduced density is restricted on the one-touch key screen 30 of FIG. 12, when the user presses the "global address search" region 32 displayed in a standard density, the operation of changing the display contents to the global address search screen 60 of FIG. 13 is acceptable. In this case, on the global address search screen 60, the user sets up into global address search input field 61 a character string of an addressee to be searched for, and then presses the "search" region 62a. As a result, an addressee registered in the LDAP server 5 is searched for. After that, on the distribution destination type selection screen 40 of FIG. 7, the user can assign the global address of the addressee obtained as the search result, to any one of "TO", "CC", and "BCC".

When a user having a security level of L2 and a name of "user 3" is authenticated successfully, the e-mail address of "user 3" is not displayed in the header part 26 of the image sending screen 25 of FIG. 11. However, the "address book" region 27 is displayed in a standard density. Thus, the user's operation of changing the display contents to the one-touch key screen 30 of FIG. 12 is acceptable. Further, the "address input" region 28 is displayed in a reduced density. Thus, the operation of changing the display contents to the address input screen 35 of FIG. 6 is restricted.

Further, on the one-touch key screen 30 of FIG. 12, the "one-touch key" region 31 and the "global address search" region 32 are displayed in a standard density. Thus, the user can select a destination registered in each one-touch key of the address book. Further, after the display contents are changed to the global address search screen 60 of FIG. 13, a set-up addressee can be searched for. After that, on the screen 40, the user can assign the global address of the selected destination or the addressee obtained as the search result, to any one of "TO", "CC", and "BCC".

An image sending screen 25 of FIG. 4 is displayed to a user having an assigned security level of L1 which is lower than L2 by one step. When a user having a name of "user 4" is authenticated successfully, the e-mail address of "user 4" is not displayed in the header part 26 of the image sending screen 25. In contrast, the "address book" region 27 and the "address input" region 28 are displayed in a standard density. Thus, the user's operation of changing the display contents to the one-touch key screen 30 of FIG. 5 and the address input screen 35 of FIG. 6 is acceptable. The display contents and the operation of the one-touch key screen 30 and the address input screen 35 are similar to those described above in association with FIGS. 5 and 6, respectively. Thus, their description is omitted here.

FIGS. 14 to 18 are flow charts showing: a processing procedure of the control section 11 of the multi-functional machine 1 serving as an embodiment of a data transmitting apparatus; and a processing procedure of the LDAP server 5 serving as an embodiment of an authentication device in a data communication system according to the present invention. In the figure, the processing procedure of the LDAP server 5 is surrounded by a dash-dotted line. The other part indicates the processing procedure of the multi-functional machine 1.

Here, a security level of Ln (n is an integer from 1 to 5) in which L1 is the minimum level is assigned to each user. The security level is registered in the LDAP server 5 in advance together with the user's own address and the global addresses of addressees. Further, image data serving as the object of data transmission is stored in the storage section 14. Furthermore, it is assumed that image data to be transmitted has already been specified. Registering of addresses and a security level into the LDAP server 5, storing of image data obtained via the image reading section 12, the modem section 151, and the like into the storage section 14, and specifying of image data to be transmitted are publicly known.

The following processing is executed by the CPU of the control section 11 in accordance with the control program stored in the ROM 17 of the multi-functional machine 1 in advance. When accepting press-down of the FAX/image transmission key 133b arranged to the operation section 13, the control section 11 starts the following processing. Here, a "destination presence flag" is stored in the RAM of the control section 11.

The control section 11 determines whether press-down of the FAX/image transmission key 133b has been accepted (step S11). When it is determined that press-down is not yet accepted (step S11: NO), the control section 11 waits until press-down of the FAX/image transmission key 133b is accepted. When the user presses the FAX/image transmission key 133b, the control section 11 determines that press-down of the predetermined key has been accepted (step S11: YES). Thus, the control section 11 performs zero-clearing of the "destination presence flag" indicating that setting of a destination by the user has already been accepted (step S12). Then, the control section 11 displays the user authentication screen 20 on the touch panel 134 (step S13). After that, the control section 11 determines whether the "login name" input field 21 and the "password" input field 22 are filled with any input (step S14).

When it is determined that the "login name" input field 21 or the "password" input field 22 is not filled with any input (step S14: NO), the control section 11 waits until each input field is filled with any input. When the user fills the "login name" input field 21 and the "password" input field 22 with predetermined characters, the control section 11 determines that each input field has been filled with an input (step S14: YES). After that, the control section 11 determines whether press-down of the "OK" region 23 of the user authentication screen 20 has been accepted (step S15). When it is determined that press-down of the "OK" region 23 is not yet accepted (step S15: NO), the control section 11 returns the procedure to step S14 in order to receive an additional input or correction into the "login name" input field 21 and the "password" input field 22. When the user presses the "OK" region 23, the control section 11 determines that press-down of the predetermined region has been accepted (step S15: YES). After that, the control section 11 requests the authentication for the user to the LDAP server 5 (step S16).

On the other hand, the LDAP server 5 waits until an authentication request is received (step S101: NO). When it is determined that an authentication request having been received (step S101: YES), the LDAP server 5 performs authentication for the object user (step S102), and then returns the authentication result to the multi-functional machine 1 (step S103).

The control section 11 of the multi-functional machine 1 waits until the authentication result is received from the LDAP server 5 (step S17: NO). When it is determined that the authentication result has been received (step S17: YES), the control section 11 determines whether the authentication has been OK (step S18). When it is determined that the authentication was not OK (step S18: NO), the control section 11 returns the procedure to step S14. When it is determined that the authentication has been OK (step S18: YES), the control section 11 requests to the LDAP server 5 the obtaining of the security level assigned to that user (step S19).

On the other hand, the LDAP server 5 waits until an obtaining request for the security level is received (step S104: NO). When it is determined that an obtaining request has been received (step S104: YES), the LDAP server 5 reads from a predetermined storage section the security level assigned to the object user (step S105), and then returns the security level to the multi-functional machine 1 (step S106).

The control section 11 of the multi-functional machine 1 waits until the security level is received from the LDAP server 5 (step S20: NO). When it is determined that the security level has been received (step S20: YES), the control section 11 displays the image sending screen 25 on the touch panel 134

(step S21). After that, the control section 11 determines whether the user's security level obtained from the LDAP server 5 is not lower than L4 which is a first threshold value (step S22). When it is determined that the users security level is not lower than L4 (step S22: YES), the control section 11 requests to the LDAP server 5 the se arching of the user oneself as an addressee (step S23).

On the other hand, the LDAP server 5 waits until an addressee search request is received (step S111: NO). Then, when it is determined that a search request having been received (step S111: YES), the user is searched for as the addressee (step S112) and then the address which is the user's destination is returned to the multi-functional machine 1 (step S113).

The control section 11 of the multi-functional machine 1 waits until an address which is the user's own destination is obtained from the LDAP server 5 (step S24: NO). When it is determined that the address has been obtained (step S24: YES), the control section 11 displays the obtained address in the header part 26 of the image sending screen 25 (step S25). Thus, when the user's security level is not lower than L4, an address is obtained which is a destination in which the authenticated user oneself is adopted as the addressee.

After that, the control section 11 determines whether the user's security level is lower than L5 which is a second threshold value (step S26). When it is determined that the user's security level is not lower than L5 (step S26: NO), the control section 11 brings the "address book" region 27 and the "address input" region 28 to be displayed in a reduced density on the image sending screen 25 (step S27). This indicates that the address book and the address input are not acceptable. Then, the control section 11 determines whether the start key 133a arranged in the operation section 13 has been pressed (step S28).

When it is determined that the start key 133a is not yet pressed (step S28: NO), the control section 11 waits until the start key 133a is pressed. When the user presses the start key 133a, the control section 11 determines that the predetermined key has been pressed (step S28: YES). Then, the control section 11 executes transmission processing for transmitting to the user's own destination the specified image data in the storage section 14 (step S29), and then terminates the procedure.

When it determined that the user's security level is lower than L4 at step S22 (step S22: NO), or alternatively when it is determined that the user's security level is lower than L5 at step S26 (step S26: YES), the control section 11 determines whether the user's security level is lower than L2 which is a third threshold value (step S41). When it is determined that the security level is not lower than L2 (step S41: NO), the control section 11 brings the "address input" region 28 of the image sending screen 25 to be displayed in a reduced density (step S42). This indicates that the address input is not acceptable.

When it is determined that the user's security level is lower than L2 (step S41: YES), or alternatively when the processing of step S42 has been completed, the control section 11 determines whether the "address book" region 27 of the image sending screen 25 has been pressed (step S43). When it is determined that the "address book" region 27 is not yet pressed (step S43: NO), the control section 11 determines whether the user's security level is lower than L2 (step S44).

When it is determined that the user's security level is lower than L2 (step S44: YES), since the "address input" region 28 is not brought into a reduced density at step S42, the control section 11 determines whether the "address input" region 28 has been pressed (step S45). When it is determined that the "address input" region 28 is not yet pressed (step S45: NO), the control section 11 determines whether the "destination presence flag" has been set up (step S46). When it is determined that the "destination presence flag" is not yet set up (step S46: NO), since this indicates that a destination to which data should be transmitted is not received, the control section 11 returns the procedure to step S43.

When it is determined that the "destination presence flag" is has been set up (step S46: YES), the control section 11 determines whether the start key 133a arranged in the operation section 13 has been pressed (step S47). When it is determined that the start key 133a is not yet pressed (step S47: NO), the control section 11 returns the procedure to step S43. When the user presses the start key 133a, the control section 11 determines that the predetermined key has been pressed (step S47: YES). Then, the control section 11 executes transmission processing for transmitting to the accepted destination the specified image data in the storage section 14 (step S48), and then terminates the procedure.

When the user has pressed the "address input" region 28 at step S45, the control section 11 determines that the predetermined region has been pressed (step S45: YES). Then, the control section 11 displays the address input screen 35 on the touch panel 134 (step S49). Then, the control section 11 determines whether the "e-mail address" input field 38 is filled with the input of an address as a destination (step S50). When it is determined that no address input is provided in the "e-mail address" input field 38 (step S50: NO), the control section 11 waits until an address is inputted.

When the user inputs an address into the "e-mail address" input field 38, the control section 11 determines that the input field has been filled with the input of an address (step S50: YES). After that, the control section 11 determines whether the "OK" region 39a of the address input screen has been pressed (step S51). When it is determined that the "OK" region 39a is not yet pressed (step S51: NO), the control section 11 determines whether the "cancel" region 39b of the address input screen 35 has been pressed (step S52).

When it is determined that the "cancel" region 39b is not yet pressed (step S52: NO), the control section 11 returns the procedure to step S50. When the user presses the "cancel" region 39b, the control section 11 determines that the predetermined region has been pressed (step S52: YES). Then, the control section 11 returns the procedure to step S21 in order that the image sending screen 25 should be displayed on the touch panel 134.

When the user has pressed the "OK" region 39a at step S51, the control section 11 determines that the predetermined region has been pressed (step S51: YES). Then, the control section 11 displays the distribution destination type selection screen 40 on the touch panel 134 (step S53). As described above, the input of an address, that is, the setting of a destination, is executed in a case that the user's security level is lower than L2 which is the third threshold value. After that, the control section 11 determines whether assignment of the distribution destination type to any one of "TO", "CC", and "BCC" has been selected (step S54). When it is determined that none of "TO", "CC", and "BCC" is yet selected (step S54: NO), the control section 11 waits until any one of "TO", "CC", and "BCC" is selected.

When the user selects assignment of the distribution destination type to any one of "TO", "CC", and "BCC", the control section 11 determines that assignment of a distribution destination type has been selected (step S54: YES). Thus, the control section 11 sets up the inputted destination to be the selected one of "TO", "CC", and "BCC" (step S55). After that, in order to store the situation that one or more destinations have been set up, the control section 11 sets up the "destination presence flag" (step S56). After that, the control section 11 returns the procedure to step S21 in order that the image sending screen 25 should be displayed on the touch panel 134.

When the user has pressed the "address book" region 27 at step S43, the control section 11 determines that the predetermined region has been pressed (step S43: YES). Then, the control section 11 displays the one-touch key screen 30 (step S61). After that, the control section 11 determines whether the user's security level is lower than L3 which is a fourth threshold value (step S62). When it is determined that the user's security level is not lower than L3 (step S62: NO), the control section 11 brings the "one-touch key" region 31 to be displayed in a reduced density (step S63). This indicates that the one-touch key is not acceptable.

After that, the control section 11 determines whether the "global address search" region 32 has been pressed (step S64). When it is determined that the "global address search" region 32 is not yet pressed (step S64: NO), the control section 11 waits until the "global address search" region 32 is pressed.

When it is determined that the security level is lower than L3 at step S62 (step S62: YES), the control section 11 determines whether the "one-touch key" region 31 has been pressed (step S65). When the user presses the "one-touch key" region 31, the control section 11 determines that the predetermined region has been pressed (step S65: YES). Then, the control section 11 returns the procedure to step S53 in order that the user should select assignment of a distribution destination type to the destination selected by pressing the "one-touch key" region 31.

As described above, selection of a destination by using the one-touch key is executed in a case that the user's security level is lower than L3 which is the fourth threshold value.

When it is determined that the "one-touch key" region 31 is not yet pressed (step S65: NO), the control section 11 determines whether the "global address search" region 32 has been pressed (step S66). When it is determined that the "global address search" region 32 is not yet pressed (step S66: NO), the control section 11 returns the procedure to step S65 in order to receive a user operation again.

When the user presses the "global address search" region 32 at step S64 or step S66, the control section 11 determines that the predetermined region has been pressed (step S64: YES or step S66: YES). Then, the control section 11 displays the global address search screen 60 (step S67). This display is performed only for users having a security level lower than L5 determined at step S26. After that, the control section 11 determines whether the "search characters" input field 61 is filled with the input of search characters for an addressee (step S68). When the user inputs search characters, the control section 11 determines that search characters have been inputted (step S68: YES). After that, the control section 11 determines whether the "search" region 62*a* in the global address search screen 60 has been pressed (step S69).

When it is determined that no search character is yet inputted (step S68: NO), or alternatively when it is determined that the "search" region 62*a* is not yet pressed (step S69: NO), the control section 11 determines whether the "cancel" region 62*b* in the global address search screen 60 has been pressed (step S70). When it is determined that the "cancel" region 62*b* is not yet pressed (step S70: NO), the control section 11 returns the procedure to step S68. When the user presses the "cancel" region 62*b*, the control section 11 determines that the predetermined region has been pressed (step S70: YES).

Then, the control section 11 returns the procedure to step S21 in order that the image sending screen 25 should be displayed on the touch panel 134.

When the user presses the "search" region 62*a* at step S69, the control section 11 determines that the predetermined region has been pressed (step S69: YES). After that, the control section 11 requests to the LDAP server 5 the search of the addressee (step S71).

On the other hand, the LDAP server 5 waits until an addressee search request is received (step S121: NO). Then, when it is determined that a search request having been received (step S121: YES), the addressee is searched for (step S122) and then the global address which is the addressee's destination is returned to the multi-functional machine 1 (step S123).

The control section 11 of the multi-functional machine 1 waits until the global address which is the destination of the addressee is received from the LDAP server 5 (step S72: NO). When it is determined that the global address has been received (step S72: YES), on the basis of whether the global address is null or not, the control section 11 determines whether the search has been OK (that is, the addressee has been registered) (step S73). When it is determined that the search by the LDAP server 5 was not OK (step S73: NO), the control section 11 returns the procedure to step S68. When it is determined that the search has been OK (step S73: YES), the control section 11 returns the procedure to step S53 in order that the user should select assignment of a distribution destination type to the global address which is the destination of the addressee obtained from the LDAP server 5.

As described above, obtaining of the global address is executed in a case that the user's security level is lower than L5 which is the second threshold value.

As described above, according to the present embodiment, an LDAP server stores in advance: a plurality of destinations including the user oneself, and security levels assigned to a plurality of users. Further, a control section of a multi-functional machine connected in a manner permitting communication with the LDAP server via a communication network provides, onto a touch panel, display contents used for receiving setting of an addressee, setting of a destination as a mail address, and selection of a destination registered in each one-touch key. When a user having logged in to the LDAP server is authenticated successfully, the control section of the multi-functional machine obtains the security level of the authenticated user from the LDAP server via a communication section. Then, in accordance with increasing obtained security level from L1 to L2, L3, and L5, the "address input" region, the "one-touch key" region, and the "address book" region are progressively displayed in a reduced density. After that, when a part of the display contents is not in a reduced density, the control section of the multi-functional machine accepts setting of a destination, selection of a destination, and setting of an addressee, respectively. When the obtained security level is not lower than L4, the control section of the multi-functional machine obtains the user's own destination from the LDAP server.

As a result, with increasing security level assigned to a user from L1 to L2, L3, and L5, operation concerning setting of a destination of data transmission, selection of a destination, and setting of an addressee is restricted progressively. Further, when the security level is not lower than L4, the user's own destination is obtained from the LDAP server. When the security level is lower than L4, at least one of the destination having been set up by the user, the destination selected by the user from among those registered in the one-touch keys, and the destination of the addressee having been set up by the user is set up into the multi-functional machine. Then, data is transmitted to the destination obtained from the LDAP server or alternatively the destination having been set up into the multi-functional machine.

Here, in the present embodiment, the "address book" region 27, the "address input" region 28, and the "one-touch key" region 31 which are display contents used for receiving setting of an addressee, setting of a destination, and selection of a destination are displayed in a reduced density. However, the present invention is not limit to this configuration. That is, each region may be brought into a non-displayed state so that operation concerning the display contents of each region should not be accepted.

Further, the threshold conditions for the security level assigned to a user in which the "address input" region 28, the "one-touch key" region 31, and the "address book" region 27 are brought into a reduced density are not limited to being not lower than L2, L3, and L5, respectively.

Further, these threshold levels need not necessarily be different from each other. For example, the second threshold value may be adopted to be L4. In this case, at step S26, it is determined whether the level is lower than L4. Thus, the determination result is always "NO". Accordingly, as described above in association with FIG. 10, users having a security level not lower than L4 are allowed to perform transmission only to the own destination displayed in the header part 26.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A data communication system comprising:
an authentication device including an authentication section for performing authentication of a user, a first storage section for storing destinations of a plurality of addressees, and a second storage section for storing security levels assigned individually to a plurality of users; and
a data transmitting apparatus that is connected in a manner permitting communication with said authentication device and that includes a first obtaining section for obtaining from said authentication device a destination of an addressee corresponding to a user when the user is authenticated successfully by said authentication device, a second obtaining section for obtaining from said authentication device a security level of the authenticated user when the user is authenticated successfully by said authentication device, and a transmitting section for transmitting data to an obtained destination;
wherein when the security level obtained by said second obtaining section is not lower than a first threshold value, said first obtaining section obtains a destination in which the authenticated user oneself is adopted as an addressee;
wherein said data transmitting apparatus includes a display section for performing display concerning data transmission and a restriction section for restricting/relaxing the display contents of said display section in accordance with high/low of the security level obtained by said second obtaining section; and wherein:
said data transmitting apparatus includes a reception section for receiving operation concerning display contents when said restriction section relaxes the display contents;
said display section provides display contents for allowing said reception section to receive setting of an addressee;
when the security level obtained by said second obtaining section is lower than a second threshold value which is not lower than the first threshold value, said restriction section relaxes the display contents used for receiving setting of an addressee; and
when said reception section receives setting of an addressee, said first obtaining section obtains from said authentication device the set-up destination of the addressee.

2. The data communication system according to claim 1, wherein
the restriction/relaxation performed by said restriction section is switching of non-displaying/displaying.

3. The data communication system according to claim 1, wherein:
said display section provides display contents for allowing said reception section to receive setting of a destination;
when the security level obtained by said second obtaining section is lower than a third threshold value which is not higher than the second threshold value, said restriction section relaxes the display contents used for receiving setting of a destination; and
when said reception section receives setting of a destination, said transmitting section transmits data to the set-up destination.

4. The data communication system according to claim 3, wherein
the restriction/relaxation performed by said restriction section is switching of non-displaying/displaying.

5. The data communication system according to claim 1, wherein:
said data transmitting apparatus includes a registration section for registering a destination;
said display section provides display contents for allowing said reception section to receive selection of a destination registered in said registration section;
when the security level obtained by said second obtaining section is lower than a fourth threshold value which is not higher than the second threshold value, said restriction section relaxes the display contents used for receiving selection of a destination; and
when said reception section receives selection of a destination, said transmitting section transmits data to the selected destination.

6. The data communication system according to claim 5, wherein
the restriction/relaxation performed by said restriction section is switching of non-displaying/displaying.

7. A data transmitting apparatus comprising:
a first obtaining section for obtaining a destination of an addressee corresponding to a user;
a transmitting section for transmitting data to the obtained destination;
a second obtaining section for obtaining a security level of the user; wherein when the security level obtained by said second obtaining section is not lower than a first threshold value, said first obtaining section obtains a destination in which the user oneself is adopted as an addressee;

a display section for performing display concerning data transmission;

a restriction section for restricting/relaxing the display contents of said display section in accordance with high/low of the security level obtained by said second obtaining section;

a reception section for receiving operation concerning display contents when said restriction section relaxes the display contents, wherein:

said display section provides display contents for allowing said reception section to receive setting of an addressee;

when the security level obtained by said second obtaining section is lower than a second threshold value which is not lower than the first threshold value, said restriction section relaxes the display contents used for receiving setting of an addressee; and when said reception section receives setting of an addressee, said first obtaining section obtains the set-up destination of the addressee.

8. The data transmitting apparatus according to claim 7, wherein the restriction/relaxation performed by said restriction section is switching of non-displaying/displaying.

9. The data transmitting apparatus according to claim 7, wherein:

said display section provides display contents for allowing said reception section to receive setting of a destination;

when the security level obtained by said second obtaining section is lower than a third threshold value which is not higher than the second threshold value, said restriction section relaxes the display contents used for receiving setting of a destination; and when said reception section receives setting of a destination, said transmitting section transmits data to the set-up destination.

10. The data transmitting apparatus according to claim 9, wherein the restriction/relaxation performed by said restriction section is switching of non-displaying/displaying.

11. The data transmitting apparatus according to claim 7, further comprising:

a registration section for registering a destination, wherein:

said display section provides display contents for allowing said reception section to receive selection of a destination registered in said registration section;

when the security level obtained by said second obtaining section is lower than a fourth threshold value which is not higher than the second threshold value, said restriction section relaxes the display contents used for receiving selection of a destination; and when said reception section receives selection of a destination, said transmitting section transmits to the selected destination.

12. The data transmitting apparatus according to claim 11, wherein the restriction/relaxation performed by said restriction section is switching of non-displaying/displaying.

\* \* \* \* \*